United States Patent Office 3,153,015
Patented Oct. 13, 1964

3,153,015
POLYMERIZABLE TRIAZINES AND PRODUCTS THEREOF
Gaetano F. D'Alelio, South Bend, Ind., assignor, by direct and mesne assignments, to Dal Mon Research Co., Cleveland, Ohio, a corporation of Delaware
No Drawing. Filed Oct. 11, 1960, Ser. No. 61,808
17 Claims. (Cl. 260—78)

This invention relates to new monomers and to new polymeric materials derived therefrom and is particularly directed to the polymerization products obtained by polymerizing a mass comprising a triazinyl compound, as defined hereinafter, in the presence or absence of other ethylenic compounds especially acrylonitrile. The invention also relates to compositions of these polymerization products adapted to the formation of shaped articles, in many cases to molecularly oriented shaped articles, particularly to fibers, threads, bristles, monofilaments, etc., hereinafter referred to as fibers, and other shaped articles such as films and the like, which articles show improved dyeing properties.

It has been known for some time that certain copolymers of acrylonitrile may be adapted to the preparation of shaped articles, such as films, fibers, foils, tubes, etc. Some of these copolymers have been regarded as capable of being cold-drawn to produce structures molecularly oriented along the fiber axis. Cold-drawing may be defined as the stretching of a polymeric material at a temperature below the melting point of the material to give a molecularly oriented structure.

The resistance of acrylonitrile polymers to dyes of all types has presented serious dyeing problems, especially in the development of synthetic fibers from these polymers. In fact, in order to dye polyacrylonitrile one commercial process resorts to the use of high pressures with water solutions or organic dispersions of dyes. It has been proposed that improvement in dye susceptibility can be obtained by the use of itaconic acid in small amounts as copolymerizing monomer in the preparation of acrylonitrile polymers. However, the polymer products obtained thereby have a tendency to crosslink upon standing at temperatures of at least about 70–80° C., or upon spinning from hot solutions. Such crosslinking causes spoliation of material by gelation during storage, embrittlement of fibers, fouling of spinning jets, and other production difficulties.

Recent attempts have been made to improve the dyeability of acrylonitrile polymers by using various polymerizable amine and amide compounds as copolymerizing monomers. However, it has been found that these comonomers cause undesirable salt formation and the products have a tendency to discolor upon exposure to light.

In accordance with the present invention, new triazinyl compounds, as defined hereinafter, have been found. It has been found further that these triazinyl compounds are polymerizable, either by themselves or in conjunction with other copolymerizable ethylenic compounds. Thus it has been found that these triazinyl compounds can be polymerized per se to form useful homopolymers. In addition it has been found that these triazinyl compounds can be polymerized with copolymerizable ethylenic compounds to form useful copolymers. Thus, in accordance with this invention, valuable polymerization products can be prepared by polymerizing a mass comprising one or more such triazinyl compounds, either in the presence or absence of other ethylenic copolymerizable compounds or their polymers. It has been found further that particularly valuable polymerization products having improved dyeing properties and improved resistance to salt formation and to discoloration in light are obtained by the polymerization of polymerizable masses comprising acrylonitrile and these triazinyl compounds, either in the presence or absence of other copolymerizable ethylenic compounds. It has been found further that valuable mixtures can be made comprising polymers of these triazinyl compounds and polymers of acrylonitrile. As used herein, the terms "polymers" and "polymerization products," unless specifically indicated otherwise, are intended to include copolymers and copolymerization products respectively.

The triazinyl compounds of this invention, hereinafter referred to as "triazine monomers," are represented by the following general formula:

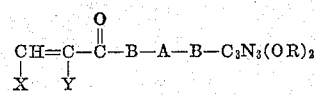

wherein B is oxygen or —N(R″)—; A is a divalent hydrocarbon radical having at least two carbon atoms between said valencies; and when that B to which the

group is attached is oxygen that part of A to which B is attached is aliphatic; X is hydrogen, cyano, —C(O)OR, —C(O)NR′₂, or —C(O)—B—A—B—C₃N₃(OR)₂; Y is hydrogen, an alkyl group of no more than 6 carbon atoms, or, when X is hydrogen, can also be chloro, fluoro, bromo, iodo, —CH₂C(O)OR, —CH₂C(O)NR′₂, or —CH₂C(O)—B—A—B—C₃N₃(OR)₂; C₃N₃ represents the symmetrical triazine (1,3,5-triazine) nucleus; R is hydrogen or a monovalent hydrocarbon radical; R′ is hydrogen or a monovalent hydrocarbon radical, or two R's are a divalent hydrocarbon or hetero group with both valencies attached to the N; R″ is hydrogen, a monovalent hydrocarbon radical or a divalent hydrocarbon with the other valency connected to A or to the second B group when the latter also represents —N(R)— so as to form a heterocyclic group; and the hydrocarbon groups of A, R, R′, and R″ can have fluoro, chloro, alkoxy, aryloxy, and acyloxy substituents thereon.

The polymeric products of this invention have repeating units in the polymer molecules of the formula:

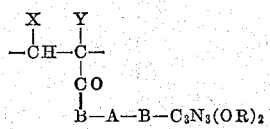

wherein X, Y, B, A, R, and R′ are as defined above.

The alkoxy, aryloxy, and acyloxy groups for A, R, R′, and R″ are advantageously radicals of no more than about ten carbon atoms such as methoxy, ethoxy, butoxy, pentoxy, octoxy, phenylmethoxy, phenylethoxy, acetoxy, propionoxy, butyroxy, valeroxy, capryloxy, benzoxy, phenylacetoxy, toluoxy, etc. Other groups can be substituted on A, R, R′, and R″ provided they are inert during the preparation and use of the triazine monomers. Moreover, A can have unsaturation therein of relatively inactive type such as —CH₂—CH=CH—CH₂—.

Typical examples of A include the following radicals

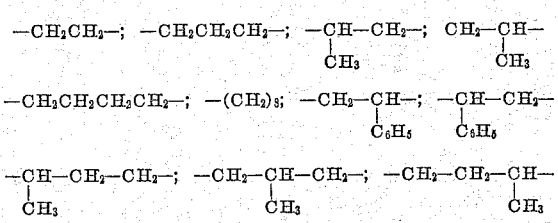

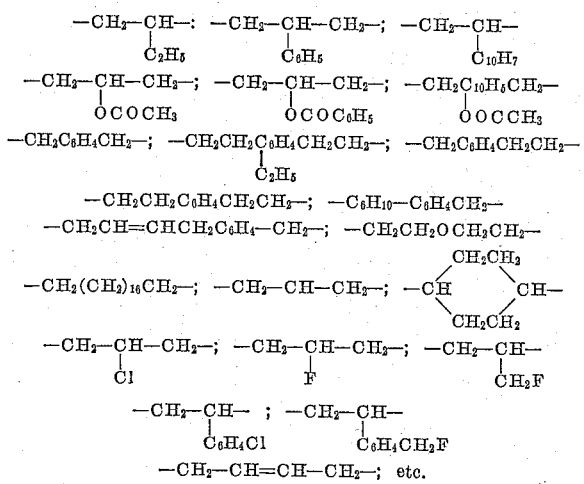

When that B to which the

group is attached is oxygen, that part of A to which that B is attached is preferably aliphatic. When that B is —N(R)—, both aliphatic and aromatic portions in A are suitable for connection to N. Accordingly A also includes as typical groups: —C$_6$H$_4$—; —C$_{10}$H$_6$—; —C$_6$H$_4$—C$_6$H$_4$—; —CH$_2$C$_6$H$_4$—; —CH$_2$CH$_2$C$_6$H$_4$—;

—CH$_2$—C$_{10}$H$_5$— etc.

The radical R can be various groups of the type indicated above including methyl, ethyl, propyl, isopropyl, n-butyl, sec-butyl, amyl, hexyl, decyl, chloromethyl, chloroethyl, fluoropropyl, cyclohexyl, methylcyclopentyl, propyl-cyclopentyl, amyl-cyclopentyl, methyl-cyclohexyl, dimethyl-cyclohexyl, chloro-cyclohexyl, phenyl, chlorophenyl, fluorophenyl, xenyl, naphthyl, tolyl, chloro-tolyl, fluoro-toyl, xylyl, ethyl-phenyl, propyl-phenyl, isopropyl-phenyl, benzyl, chloro-benzyl, phenethyl, phenylpropyl, phenyl-butyl, acetoxy-ethyl, acetoxy-phenyl, acetoxy-benzyl, acetoxy-tolyl, acetoxy-cyclohexyl, chlorophenoxy-ethyl, acetoxy-propyl, acetoxy-isopropyl, methoxy-propyl, ethoxy-propyl, methoxy-phenyl, methoxy-benzyl, methoxy-tolyl, methoxy-cyclohexyl, etc.

Typical R' groups include the hydrocarbon groups listed above for R, and two R' groups can be a divalent aliphatic or hetero- group linked to form with the nitrogen a heterocyclic group such as the piperidyl, piperazinyl or morpholino group.

Typical R'' groups include the monovalent groups listed above for R' and also the R'' groups attached to a nitrogen connected to A can be connected to form with A, or when a second nitrogen is connected to A, with the other nitrogen and A, a heterocyclic group such as a piperazinyl or piperidyl group.

While other hydrocarbon and substituted hydrocarbon groups are also effective as R, R' and R'' groups, the groups indicated above are preferred for reasons of availability and economy. Although many of the illustrations herein for NR'$_2$ groups show similar R' groups such as in dimethylamino, etc., it is intended that mixed groups are also covered hereby, that is methyl-ethylamino, etc., and that one NR'$_2$ can be dimethylamino, etc., and where there is another NR'$_2$ group in the same compound, it can be different, such as diethylamino, etc.

It has been found that A, R, R' and R'' groups of the sizes indicated above give the most effective results. While larger groups are also effective, triazine monomers containing such larger groups act more sluggishly and generally best results are obtained when such groups each have less than twelve carbon atoms.

Triazinyl amines from which the triazinyl portion of the above formula can be derived are those symmetrical triazines (1,3,5-triazine) whose nucleus is

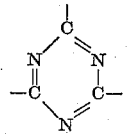

and to which an amidifiable aminoalkyl hydrocarbon group or esterifiable hydrocarbon group is attached through an amino or ether linkage. This triazine nucleus is sometimes represented herein as C$_3$N$_3$. Triazinyl compounds which can be used in preparing the compositions of this invention have the structure

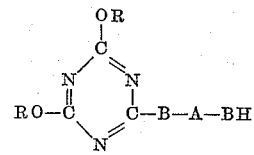

where R, B, and A are as previously defined. Methods for preparing such intermediate compounds are known in the art. The monomers are prepared by forming the acrylic, alpha-methacrylic, beta-cyanoacrylic, alpha-ethacrylic, itaconic, maleic, fumaric, mesaconic, citraconic, etc., ester and amide derivatives of the above intermediates to give products of the above general formula.

The monomers used in the practice of the invention can be formed by reacting the triazine compounds containing either an esterifiable hydroxyl group or an amino group containing an active hydrogen with a polymerizable ethylenic carboxylic acid or anhydride such as itaconic acid, itaconic acid anhydride, itaconic acid monoesters, itaconic acid monoamides, acrylic acid, alpha-methacrylic acid, beta-cyano-acrylic acid, maleic acid, maleic acid monoesters, maleic acid monoamides, corresponding mesaconic and citraconic acid derivatives, etc. The acyl chlorides, or other halides, of these acids can be used also. When dibasic acids of the anhydrides thereof are used, one of the carboxylic groups can be esterified before the triazinyl amidation or triazinyl esterification. An amide group similarly can be introduced before the triazinyl amidation or esterification. Likewise when the dibasic acids or anhydrides thereof are used, the derivative can be carried either to the mono stage only, the remaining carboxylic acid group can then be esterified or amidated as desired. In these and other ways known to those skilled in the art monomers of this invention can be prepared.

The monomers of this invention are readily prepared by reacting the corresponding acid, acid anhydride or acid chloride with the corresponding triazine compound represented by the symbol K—H, e.g.

(a) CH$_2$=CHCOOH+K—H→CH$_2$=CHCOK+H$_2$O (b)
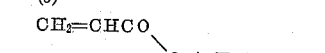
CH$_2$=CHCOK + CH$_3$=CH$_2$CHCOOH (c) CH$_2$=CHCOCl+K—H+R$_3$N→
CH$_2$=CHCOK+R$_3$N·HCl The syntheses of the monomers of this invention are illustrated in Example I.

The invention will be more fully described by the following examples. The invention is not to be regarded, however, as restricted in any way by these examples and they are to serve merely as illustrations. In these examples and throughout the specification, "parts" and "percentages" shall mean parts by weight and percentages by weight unless specifically provided otherwise.

Examples I-a through I-p illustrate methods of preparing various types of monomers of this invention. After each of these examples, a series of formulas are given of typical monomers. These monomers are identified by a series of Roman numerals and letters. The Roman numeral corresponds to a subsequent example illustrating the use of that particular monomer in the preparation of polymers. The capital letter in the polymer designation corresponds to the small letter in the designation of examples illustrating the method of producing that monomer. In the series of Roman numerals used to designate particular monomer formulas, I, II, and V are omitted since Examples I, II, and V are directed to procedures other than the preparation of polymers. After X, this listing has no particular significance since the examples illustrating polymerizations go no higher than X.

While the size and type of groups, as well as the number of substituents thereon, are disclosed quite broadly herein, the examples illustrate the size and type of compounds that are preferred for the practice of this invention. Particularly preferred are compounds in which hydrocarbon radicals A, R, R' and R" each advantageously has no more than 18 carbon atoms therein, preferably no more than 10 carbon atoms, and advantageously has no more than one substituent group of the types defined, preferably no substituent groups. These hydrocarbon groups preferably are aliphatic, cycloaliphatic, or aromatic groups, or combinations thereof, advantageously having no acetylenic unsaturation therein. It is preferred also that either X or Y is hydrogen. When X is hydrogen, Y is preferably hydrogen, chlorine, an alkyl group of no more than 6 carbon atoms, —C(O)OR,

—C(O)NR'$_2$ or —C(O)—B—A—B—C$_3$N$_3$(OR)$_2$; and when Y is hydrogen, X is preferably hydrogen, a cyano group, or

—C(O)OR

—C(O)NR'$_2$, or —C(O)—B—A—B—C$_3$N$_3$(OR)$_2$. Also where an amino group has been indicated as being part of a heterocyclic ring these are preferably piperazinyl, piperidinyl, or morpholino groups.

EXAMPLE I-a

*Preparation of Triazine Monomer*

Acrylyl chloride (18.1 parts) in 50 parts of diethyl ether is added slowly and with stirring to a mixture of 40 parts of 2,4-dimethoxy-6-(beta-hydroxyethylamino)-1,3,5-triazine and 150 parts of diethyl ether containing 37 parts of tributyl amine in a flask equipped for reflux. Upon completion of the addition of the acid chloride, the mixture is refluxed for approximately one-half hour and allowed to cool to room temperature, after which it is washed with water to remove the amine hydrochloride. The ether is then evaporated and the product again washed with water and recrystallized from acetone water mixtures. There is obtained 2,4-dimethoxy-6-(beta-acryloxy-ethylamino)-1,3,5-triazine. Ultimate analyses for carbon, hydrogen, and nitrogen and molecular weight determination give values of 47.32%, 5.52%, 22.24% and 255.7, respectively, all of which values are in close agreement with the theoretical values.

Substitution of an equivalent quantity of methacrylyl chloride for the acrylyl chloride in the foregoing procedure, yields the corresponding triazine monomer. Ultimate analyses and molecular weight determination give 49.34% carbon, 5.97% hydrogen, 20.92% nitrogen and molecular weight of 269.2, all of which values agree closely with the theoretical values for 2,4-dimethoxy-6-(beta-methacryloxy-ethylamino)-1,3,5,-triazine. The corresponding chloracrylic derivative can be similarly prepared by use of chloracrylyl chloride.

The various other triazine monomers of this invention can be prepared by the foregoing procedure using the appropriate acrylic and triazine intermediates. For example, the following monomers prepared accordingly are identified by the analyses and molecular weights indicated, all of which check closely with the theoretical values:

(a) 2,4-dimethoxy - 6 - (N-methyl-beta-acryloxy-ethylamino)-1,3,5-triazine, with carbon, hydrogen, nitrogen and molecular weight values of 49.35%, 5.98%, 20.90% and 267.6, respectively;

(b) 2,4-diethoxy - 6 - (beta-chloracryloxy-ethylamino)-1,3,5-triazine, with carbon, hydrogen, nitrogen, chlorine and molecular weight values of 45.53%, 5.37%, 17.66%, 11.22% and 317.6, respectively;

(c) 2,4-diphenoxy - 6 - (beta-methacryloxy-ethylamino)-1,3,5-triazine, with carbon, hydrogen, nitrogen and molecular weight values of 64.34%, 5.10%, 14.26% and 393.6, respectively;

(d) 2,4-dibenzyloxy - 6 - (6-acryloxy-n-hexylamino)-1,3,5-triazine, with carbon, hydrogen, nitrogen and molecular weight values of 67.15%, 6.50%, 12.11% and 464.1, respectively;

(e) 2,4-dimethoxy - 6 - (4-acryloxy-N-piperidyl)-1,3,5-triazine, with carbon, hydrogen, nitrogen and molecular weight values of 53.02%, 6.12%, 19.13% and 293.8, respectively.

Other methods of preparing the triazine monomers of this invention can be used. For example, acrylic anhydride, as well as the corresponding alpha-methyl (methacrylic) and alpha-chloro (chloracrylic) homologs can be used, according to well-known techniques for producing esters, with appropriate triazinyl alcohols to give desired triazine monomers. In certain cases, the triazine monomer can also be prepared by reacting an ester, such as methyl acrylate with a triazinyl alcohol to give the corresponding triazine monomer by displacement of methyl alcohol. In other cases, where a stable amino ester can be isolated, such as CH$_2$=CHCOOCH$_2$CH$_2$NH$_2$, it can be reacted with a cyanuric chloride derivative

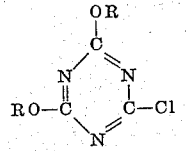

in the presence of an hydrohalide acceptor, such as NaOH, to produce triazine monomers by well-known procedures.

Typical symmetrical triazine alcohols that can be used to give desired monomers of this invention include:

(1) HO—CH$_2$CH$_2$N(CH$_3$)—C$_3$N$_3$(OCH$_3$)$_2$ (2) HO—CH$_2$CH$_2$NH—C$_3$N$_3$(OC$_2$H$_5$)$_2$ (3) HO—CH$_2$CH$_2$NH—C$_3$N$_3$(OC$_6$H$_5$)$_2$ (4) HO—(CH$_2$)$_6$NH—C$_3$N$_3$(OCH$_2$C$_6$H$_5$)$_2$ (5) HO—CH$_2$CH(CH$_3$)—NH—C$_3$N$_3$(OC$_4$H$_9$)$_2$ (6) HO—CH(CH$_3$)—CH$_2$—NH—C$_3$N$_3$(O—CH(CH$_2$CH$_2$)$_2$CH$_2$)$_2$ (7) HO—CH$_2$—CH(C$_6$H$_5$)—CH$_2$NH—C$_3$N$_3$(OCH$_2$CH$_2$OOCCH$_3$)$_2$ (8) HO—CH(CH$_2$CH$_2$)$_2$CH—NH—C$_3$N$_3$(OCH$_2$CH$_2$OC$_2$H$_5$)$_2$ (9) HO—CH$_2$—CH(OCOC$_6$H$_5$)—CH$_2$—NH—C$_3$N$_3$(OCH$_2$CH$_2$Cl)$_2$

(10) HO—CH$_2$—C$_6$H$_4$—NH—C$_3$N$_3$(OC$_5$H$_{11}$)$_2$

(11) HO—CH—CH$_2$  
  \    \  
   CH$_2$  N—C$_3$N$_3$(OCH$_2$CH$_2$C$_6$H$_4$Cl)$_2$  
  /    /  
  CH$_2$—CH$_2$

(12)
$$HO-CHC-H_2$$
$$CH_2\quad N-C_3N_3(OC_6H_4CH_3)_2$$
$$CH_2-CH_2$$

Various triazine monomers used hereinafter in the examples have the following structures in which $C_3N_3$ represents the trivalent symmetrical triazine nucleus:

Triazine monomer III-A $$CH_2=CHCOOCH_2CH_2NH-C_3N_3(OCH_3)_2$$

Triazine monomer IV-A $$CH_2=CHCOOCH_2CH_2NH-C_3N_3(OC_2H_5)_2$$

Triazine monomer VI-A $$\overset{Cl}{\underset{|}{CH_2=C}}-COOCH_2CH_2NH-C_3N_3(OCH_3)_2$$

Triazine monomer VII-A $$\overset{CH_3}{\underset{|}{CH_2=C}}-COOCH_2CH_2NH-C_3N_3(OCH_3)_2$$

Triazine monomer VIII-A $$\overset{CH_3}{\underset{|}{CH_2=C}}-COOCH_2\overset{CH_3}{\underset{|}{CH}}NH-C_3N_3[OCH(CH_3)_2]_2$$

Triazine monomer IX-A $$CH_2=CHCOO(CH_2)_6NH-C_3N_3(OCH_3)_2$$

Triazine monomer X-A $$CH_2=CHCOOCH_2CH_2\underset{\underset{CH_3}{|}}{N}-C_3N_3(OC_2H_5)_2$$

Triazine monomer XI-A $$CH_2=CHCOOCH_2CH_2CH_2NH-C_3N_3(OC_6H_5)_2$$

Triazine monomer XII-A $$CH_2=CHCOO(CH_2)_6\underset{\underset{\underset{CH_2-OC_2H_5}{|}}{\underset{CH_2}{|}}}{N}-C_3N_3(OCH_2C_6H_5)_2$$

Triazine monomer XIII-A $$CH_2=CHCOO-CH\underset{CH_2CH_2}{\overset{CH_2CH_2}{\diagup}}N-C_3N_3-O-CH\underset{CH_2CH_2}{\overset{CH_2CH_2}{\diagup}}CH_2\quad OCH_3$$

Triazine monomer XIV-A $$CH_2=CHCOOCH_2-\underset{\underset{CH_3}{|}}{CH}-NH-C_3N_3(OC_6H_4Cl)_2$$

Triazine monomer XV-A $$CH_2=CHCOOCH_2-C_6H_4-CH_2-NH$$
$$-C_3N_3(OCH_2CH_2OCOCH_3)_2$$

Triazine monomer XVI-A $$CH_2=CHCOOCH_2CH_2\underset{\underset{\underset{CH_2-OC_6H_5}{|}}{\underset{CH_2}{|}}}{N}-C_3N_3(OCH_2CH_2OC_6H_5)_2$$

EXAMPLE I-b

Preparation of Triazine Monomers (a) Itaconic anhydride (11.2 parts) in 50 parts of benzene is added slowly and with stirring to a mixture of 20 parts of 2,4-dimethoxy-6-(beta-hydroxyethylamino)-1,3,5-triazine and 150 parts diethyl ether. Upon completion of the addition of the anhydride, the mixture is refluxed for approximately one hour, after which it is allowed to cool to room temperature and is washed with water. The ether and benzene are then evaporated and the ester is recrystallized from acetone-water mixtures. There is obtained the itaconic acid monoester of the above triazine compound. Ultimate analyses for carbon, hydrogen, and nitrogen, and molecular weight determination, give values which are in close agreement with the theoretical values.

Substitution of equivalent quantities of the various other triazinyl alcohols described above for the one used in the foregoing procedure yields various monoesters of itaconic acid of this invention. These are identified by ultimate analyses and molecular weight determinations as above. These mono-acid esters can be used as such or can be converted to alkyl esters by reacting their sodium salts in the standard manner, with dialkyl sulfates, as for example with dimethyl or diethyl sulfate to produce the corresponding methyl, ethyl or other alkyl esters. These esters may also be prepared as in the following procedure (b).

(b) Monoethyl itaconyl monochloride (16.3 parts) in 150 parts of diethyl ether is added slowly and with stirring to a mixture of 20 parts of 2,4-dimethoxy-6-(beta-hydroxyethylamino)-1,3,5-triazine and 150 parts of diethyl ether containing 18.5 parts of tributylamine. Upon completion of the addition of the acid chloride, the mixture is refluxed for approximately one-half hour, then allowed to cool to room temperature and washed with water to remove the amine hydrochloride. The ether is then evaporated, the ester again washed with water and the product recrystallized from acetone-water mixtures. There is obtained the monomethyl ester of the itaconic mono-ester of 2,4-dimethoxy-6-(beta-hydroxyethylamino)-1,3,5-triazine. Ultimate analyses for carbon, hydrogen, and nitrogen, and molecular weight determination, give values which check closely with the theoretical values. Substitution of equivalent quantities of the various mono-esters and of various triazinyl alcohols, as described above, for the mono-ester and triazinyl alcohol of the foregoing procedure yields various itaconic mixed esters of this invention. These are characterized by ultimate analyses and molecular weight determinations as above.

(c) In place of the mono-acid chloride of (b), there is used 16.75 parts of itaconic dichloride, together with 40 parts of 2,4-dimethoxy-6-(beta-hydroxyethylamino)-1,3,5-triazine and 37 parts of tributyl amine, and according to the same procedure for the itaconyl monochloride, there is obtained the itaconic diester of this triazinyl alcohol. Ultimate analysis for carbon, hydrogen, and nitrogen, and molecular weight determination, give values which check closely with the theoretical values. When the various other triazinyl alcohols described above are substituted respectively in equivalent quantities in this foregoing procedure, the corresponding itaconic di-esters are obtained.

(d) In place of the monomethyl itaconyl monochloride of (b), there is used an equivalent amount of mono-(dimethylamido)-itaconyl monochloride. (This monoamide can be prepared by reacting, mole per mole, dimethylamine and itaconic acid anhydride and subsequently converting the free acid group of the resulting mono-(dimethylamido)-itaconic mono-acid to an acid chloride group by the ordinary methods of converting acids to acyl chlorides, such as, for example, by reacting with thionyl chloride.) The procedure of (b) is followed to produce mono-(dimethylamido)-itaconic monoester of 1,4-dimethoxy-6-(beta-hydroxyethylamino)-1,3,5-triazine. Ultimate analyses for carbon, hydrogen, and nitrogen, and molecular weight determination show values which check closely with the theoretical values. Substitution of various other monoamides of itaconic acid, including the morpholino, piperidyl and piperazinyl monoamides, and of various other triazinyl alcohols, as described above for the monoamide monochloride and triazinyl alcohol of the foregoing procedure yields various itaconic amide-ester triazine monomers of this invention.

The following compounds of this invention, prepared according to the foregoing procedures, show values on ultimate analyses and molecular weight determination which check closely with the theoretical values: morpholino monoamide of itaconic monoester of 2,4-dimethoxy - 6 - (gamma - hydroxypropylamino) - 1,3,5 - triazine; piperidyl monoamide of itaconic monoester of 2,4 - dibutoxy - 6 - (gamma - hydroxybutylamino) - 1,3,5-triazine; monobutyl itaconic ester of 2,4-dipropoxy-6-(beta - hydroxy - ethylphenylamino) - 1,3,5 - triazine; piperazinyl monoamide of itaconic monoester of 2,4-dimethoxy-6-(beta-hydroxyethylamino)-1,3,5-triazine.

Methods other than shown above can also be used for preparing the esters of this invention. For example,

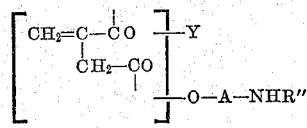

and

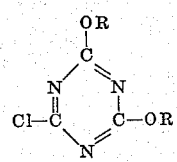

can be reacted together under conditions known in the art for similar condensations to give triazine monomers of this invention.

Various triazine monomers used hereinafter in the examples have the following formulas in which $C_3N_3$ represents the trivalent symmetrical triazine nucleus:

Triazine monomer III-B

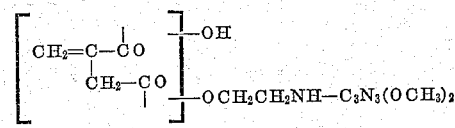

Triazine monomer IV-B

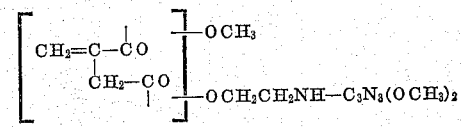

Triazine monomer VI-B

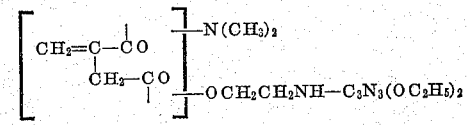

Triazine monomer VII-B

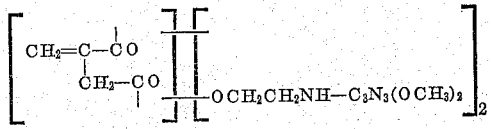

Triazine monomer VIII-B

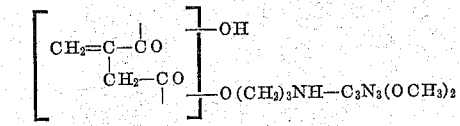

Triazine monomer IX-B

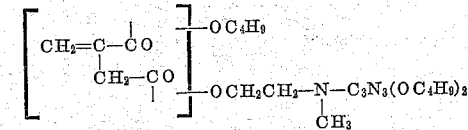

Triazine monomer X-B

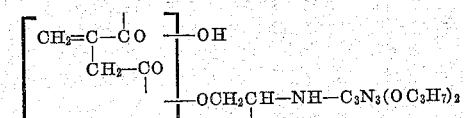

Triazine monomer XI-B

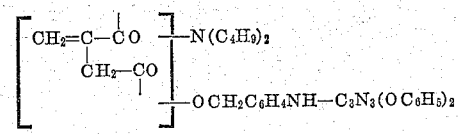

Triazine monomer XII-B

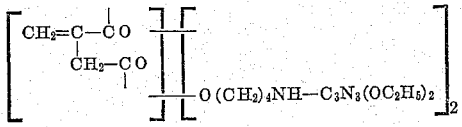

Triazine monomer XIII-B

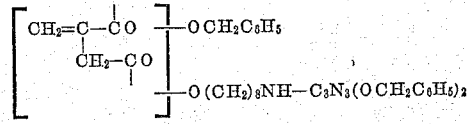

Triazine monomer XIV-B

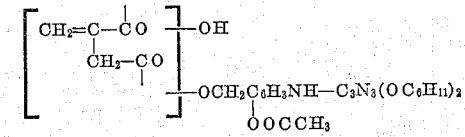

Triazine monomer XV-B

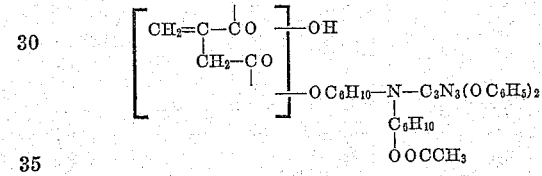

Triazine monomer XVI-B

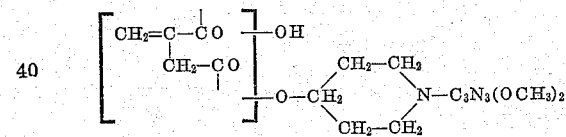

EXAMPLE I-c

*Preparation of Triazine Monomer*

Beta-cyano-acrylyl chloride (23.1 parts) in 150 parts of diethyl ether is added slowly and with stirring to a mixture of 40 parts of 2,4-dimethoxy-6-(beta-hydroxyethylamino)-1,3,5-triazine and 150 parts of diethyl ether containing 37 parts of tributyl amine in a flask equipped for reflux. Upon completion of the addition of the acid chloride, the mixture is refluxed for approximately one-half hour and allowed to cool to room temperature, after which it is washed with water to remove the amine hydrochloride. The ether is then evaporated and the product again washed with water and recrystallized from acetone-water mixtures. There is obtained 2,4-dimethoxy-6-[beta-(beta-cyano-acryloxy)ethylamino] - 1,3,5 - triazine. Ultimate analyses for carbon, hydrogen, and nitrogen and molecular weight determination give values of 47.32%, 4.66%, 25.11% and 280.2, respectively, all of which values are in close agreement with the theoretical values.

Substitution of an equivalent quantity of beta-cyano-methacrylyl chloride for its homolog in the foregoing procedure, yields the corresponding triazine monomer. Ultimate analyses and molecular weight determination give 49.21% carbon, 5.12% hydrogen, 24.23% nitrogen and molecular weight of 291.9, all of which values agree closely with the theoretical values for 2,4-dimethoxy-6-[beta-(beta-cyano-methacryloxy)-ethylamino]-1,3,5 - triazine. The corresponding chloracrylic derivative can be similarly prepared by use of beta-cyano-chloracrylyl chloride.

The various other triazine monomers of this invention can be prepared by the foregoing procedure using the appropriate beta-cyano-acrylic and triazine intermediates. For example, the following monomers prepared accordingly are identified by the analyses and molecular weights indicated, all of which check closely with the theoretical values:

(a) 2,4-dimethoxy-6 - [N-methyl-beta-(beta-cyano-acryloxy)-ethylamino]-1,3,5-triazine, with carbon, hydrogen, nitrogen and molecular weight values of 49.23%, 5.11%, 24.21% and 295.1, respectively;

(b) 2,4-diethoxy - 6 - [beta-(beta-cyano-chloracryloxy)-ethylamino] - 1,3,5-triazine, with carbon, hydrogen, nitrogen, chlorine and molecular weight values of 47.74%, 4.69%, 20.44%, 10.35% and 339.2, respectively;

(c) 2,4-diphenoxy-6 - [beta-(beta-cyano-methacryloxy)-ethylamino] - 1,3,5-triazine, with carbon, hydrogen, nitrogen and molecular weight values of 63.43%, 4.56%, 16.80% and 418.7, respectively;

(d) 2,4-dibenzyloxy-6 - [6-(beta-cyano-acryloxy-n-hexylamino]-1,3,5-triazine, with carbon, hydrogen, nitrogen and molecular weight values of 66.71%, 5.95%, 14.41% and 486.3, respectively;

(e) 2,4-dimethoxy-6 - [4-(beta-cyano-acryloxy)-N-piperidyl]-1,3,5-triazine, with carbon, hydrogen, nitrogen and molecular weight values of 52.72%, 5.32%, 21.91% and 320.6, respectively.

Other methods of preparing the triazine monomers of this invention can be used. For example, the beta-cyano-acrylic anhydride, as well as the corresponding alpha-methyl (beta-cyano-methacrylic) and alpha-chloro (beta-cyano-chloracrylic) homologs can be used, according to well-known techniques for producing esters, with appropriate triazinyl alcohols to give desired triazine monomers. In certain cases, the triazine monomer can also be prepared by reacting an ester, such as methyl-beta-cyano-acrylate, with a triazinyl alcohol to give the corresponding triazine monomer by displacement of methyl alcohol. In other cases, where a stable amino-ester can be isolated, such as CN—CH=CHCOOCH$_2$CH$_2$NH$_2$, it can be reacted with a cyanuric chloride derivative

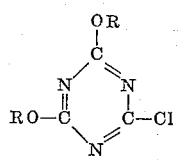

in the presence of an hydrohalide acceptor, such as NaOH, to produce triazine monomers by well-known procedures.

Typical symmetrical triazinyl alcohols that can be used to give desired monomers of this invention include:

(1) HO—CH$_2$CH$_2$NHC$_3$N$_3$(OCH$_3$)$_2$
(2) HO—CH$_2$CH$_2$NH—C$_3$N$_3$(OC$_2$H$_5$)$_2$
(3) HO—CH$_2$CH$_2$NH—C$_3$N$_3$(OC$_6$H$_5$)$_2$
(4) HO—(CH$_2$)$_6$NH—C$_3$N$_3$(OCH$_2$C$_6$H$_5$)$_2$
(5) HO—CH$_2$CH—NH—C$_3$N$_3$(OC$_4$H$_9$)$_2$
       |
       CH$_3$ (6) 
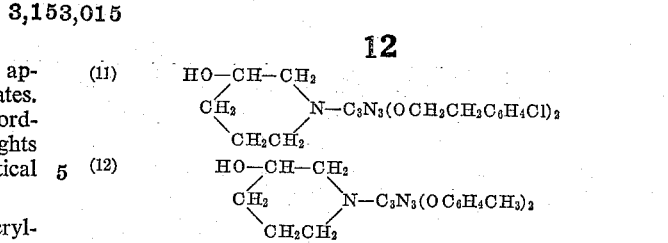

(7) HO—CH$_2$—CH—CH$_2$NH—C$_3$N$_3$(OCH$_2$CH$_2$OOCCH$_2$)$_2$
         |
         C$_6$H$_5$ (8) 
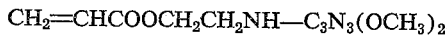

(9) HO—CH$_2$—CH—CH$_2$—NH—C$_3$N$_3$(OCH$_2$CH$_2$Cl)$_2$
           |
           OCOC$_6$H$_5$

(10) HO—CH$_2$—C$_6$H$_4$—NH—C$_3$N$_3$(OC$_5$H$_{11}$)$_2$

(11) 
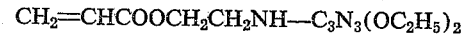

(12) 
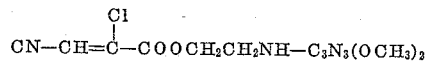

Various triazine monomers used hereinafter in the examples have the following structures in which C$_3$N$_3$ represents the trivalent symmetrical triazine nucleus:

Triazine monomer III–C

CH$_2$=CHCOOCH$_2$CH$_2$NH—C$_3$N$_3$(OCH$_3$)$_2$

Triazine monomer IV–C

CH$_2$=CHCOOCH$_2$CH$_2$NH—C$_3$N$_3$(OC$_2$H$_5$)$_2$

Triazine monomer VI–C

Cl
            |
CN—CH=C—COOCH$_2$CH$_2$NH—C$_3$N$_3$(OCH$_3$)$_2$

Triazine monomer VII–C

CH$_3$
            |
CN—CH=C—COOCH$_2$CH$_2$NH—C$_3$N$_3$(OCH$_3$)$_2$

Triazine monomer VIII–C

CH$_3$        CH$_3$
            |            |
CN—CH=C—COOCH$_2$CNHN—C$_3$N$_3$[OCH(CH$_3$)$_2$]$_2$

Triazine monomer IX–C

CN—CH=CHCOO(CH$_2$)$_{26}$NH—C$_3$N$_3$(OCH$_3$)$_2$

Triazine monomer X–C

CN—CH=CHCOOCH$_2$CH$_2$N—C$_3$N$_3$(OC$_2$H$_5$)$_2$
                        |
                        CH$_3$

Triazine monomer XI–C

CN—CH=CHCOOCH$_2$CH$_2$CH$_2$NH—C$_3$N$_3$(OC$_6$H$_5$)$_2$

Triazine monomer XII–C

CN—CH=CHCOO(CH$_2$)$_6$N—C$_3$N$_3$(OCH$_2$C$_6$H$_5$)$_2$
                       |
                       CH$_2$
                       |
                       CH$_2$—OC$_2$H$_5$

Triazine monomer XIII–C

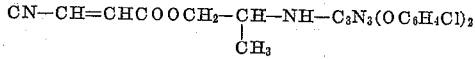

Triazine monomer XIV–C

CN—CH=CHCOOCH$_2$—CH—NH—C$_3$N$_3$(OC$_6$H$_4$Cl)$_2$
                    |
                    CH$_3$

Triazine monomer XV–C

CN—CH=CHCOOCH$_2$C$_6$H$_4$—CH$_2$—
                           NH—C$_3$N$_3$(OCH$_2$CH$_2$OCOCH$_3$)$_2$

Triazine monomer XVI–C

CN—CH=CHCOOCH$_2$CH$_2$N—C$_3$N$_3$(OCH$_2$CH$_2$OC$_6$H$_5$)$_2$
                       |
                       CH$_2$
                       |
                       CH$_2$—OC$_6$H$_5$

EXAMPLE I-d

*Preparation of Triazine Monomers*

(a) Maleic anhydride (9.8 parts) in 150 parts of benzene is added slowly and with stirring to a mixture of 10 parts of 2,4-dimethoxy-6-(beta-hydroxyethylamino)-1,3,5-triazine and 150 parts of diethyl ether. Upon completion of the addition of the anhydride, the mixture is refluxed for approximately one hour, after which it is allowed to cool to room temperature and is washed with water. The ether and benzene are then evaporated and the ester is recrystallized from acetone-water mixtures. There is obtained the maleic acid monoester of the above triazine compound. Ultimate analyses for carbon, hydrogen, and nitrogen, and molecular weight determination, give values which are in close agreement with the theoretical values.

Substitution of equivalent quantities of the various other triazinyl alcohols described above for the one used in the foregoing procedure yields various monoesters of maleic acid of this invention. Corresponding fumaric, mesaconic, citraconic, chloromaleic, and chlorofumaric derivatives are prepared by using the corresponding acid anhydride according to the above procedure, or by using the corresponding acid chloride according to the procedure (b) given below. These are identified by ultimate analyses and molecular weight determinations as above. These mono-acid esters can be used as such or can be converted to alkyl esters by reacting their sodium salts in the standard manner, with dialkyl sulfates, as for example with dimethyl or diethyl sulfate to produce the corresponding methyl, ethyl, or alkyl esters. These esters can also be prepared as in the following procedure (b).

(b) The procedure of (a) is repeated using 14.85 parts of monomethyl fumaryl chloride in 150 parts of diethyl ether instead of the maleic anhydride solution and also using 18.5 parts of tributyl amine in the solution of the triazine. The monomethyl fumaric ester of 2,4-dimethoxy-6-(beta-hydroxyethylamino)-1,3,5-triazine is obtained which gives ultimate analyses and molecular weight values which check closely with the theoretical values. The fumaryl monochloride is similarly used to prepare the fumaric monoacid triazine monoester. The corresponding monomethyl maleic chloride is similarly used to prepare the corresponding mixed ester. Substitution of equivalent quantities of the various monoesters and of various triazinyl alcohols, as described above, for the monoester and triazinyl alcohol of the foregoing procedure, yields various corresponding esters of this invention. These are characterized by ultimate analyses and molecular weight determinations as above.

(c) The procedure of (b) is repeated using 7.65 parts of fumaryl dichloride instead of the 14.85 parts of monomethyl fumaryl chloride. The fumaryl diester of 2,4-dimethoxy-6-(beta-hydroxyethylamino)-1,3,5-triazine is obtained which gives ultimate analyses and molecular weight values which check closely with the theoretical values. Maleic dichloride and the dichlorides of the other acids indicated above are used similarly to produce the corresponding triazine diesters. When the various other triazinyl alcohols described above are substituted respectively in equivalent quantities in this foregoing procedure, the corresponding diesters are obtained.

(d) The procedure of (b) is repeated using 16.15 parts of mono(di-methylamido)-maleic chloride instead of the 14.85 parts of monomethyl fumaryl chloride. (This monoamide can be prepared by reacting, mole per mole, dimethylamine and maleic anhydride and subsequently converting the free acid group of the resulting mono-(dimethylamido)-maleic monoacid to the acid chloride by the ordinary methods of converting acids to acyl chlorides, such as for example, by reacting with thionyl chloride.) There is obtained the mono-(dimethylamido)-maleic ester of 2,4-dimethoxy-6-(beta-hydroxyethylamino)-1,3,5-triazine which gives ultimate analyses and molecular weight values which check closely with the theoretical values. The corresponding fumaryl monoamide monochloride is used similarly to produce the corresponding amide ester. Substitution of various other ethenedioic monoamides, and various other triazinyl alcohols, as described above, for the monoamide and triazinyl alcohol of the foregoing procedure yields various amide ester triazine monomers of this invention.

Various other triazine monomers of this invention can be prepared by the foregoing procedure using the appropriate ethenedioic acid derivatives and triazine intermediates. For example, the following monomers prepared accordingly are identified by ultimate analyses and molecular weight values, all of which check closely with the theoretical values: morpholino monoamide of maleic monoester of 2,4-dimethoxy-6-(gamma-hydroxy-propylamino)-1,3,5-triazine; piperidyl monoamide of fumaryl monoester of 2,4-dibutoxy-6-(gamma-hydroxybutylamino)-1,3,5-triazine; monobutyl alpha-chlormaleic monoester of 2,4-dipropoxy-6-(beta-hydroxyethylphenylamino)-1,3,5-triazine; piperazinyl monoamide of alpha-methylmaleic monoester of 2,4-diethoxy-6-(beta-hydroxyethylamino)-1,3,5-triazine.

Various other methods can also be used for the preparation of the monomers. For example, appropriate compounds of the formulas

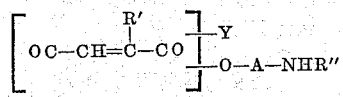

and

can be condensed in the presence of a hydrohalide acceptor such as sodium hydroxide under conditions known in the art for similar cyanuric chloride condensations, to produce desired triazine monomers.

As a further example of such other methods, such triazine monomers can also be prepared by using an appropriate triazine alcohol, as indicated above to displace a low molecular weight alcohol from corresponding ethenedioic esters, such as the methyl ester of maleic, fumaric, mesaconic, citraconic, chloromaleic, and chlorofumaric acids.

Various triazine monomers used hereinafter in the examples have the following structures wherein $C_3N_3$ represents the trivalent triazine nucleus:

Triazine monomer III-D

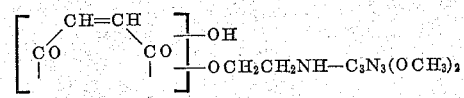

Triazine monomer IV-D

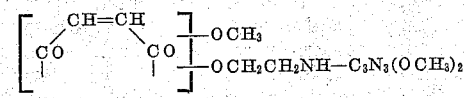

Triazine monomer VI-D

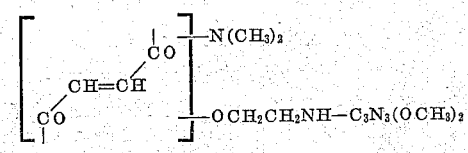

Triazine monomer VII-D

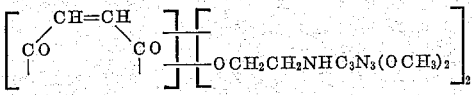

Triazine monomer VIII-D

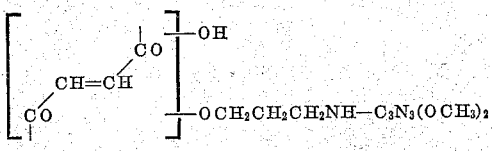

Triazine monomer IX-D

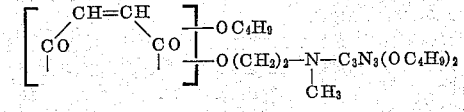

Triazine monomer X-D

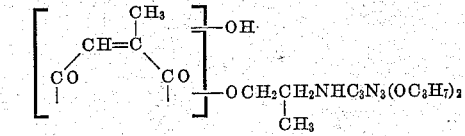

Triazine monomer XI-D

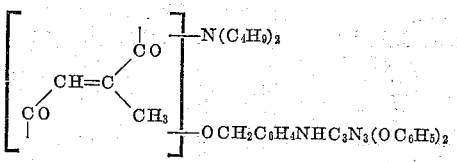

Triazine monomer XII-D

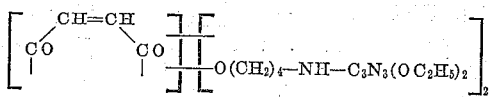

Triazine monomer XIII-D

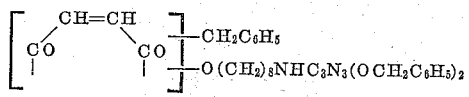

Triazine monomer XIV-D

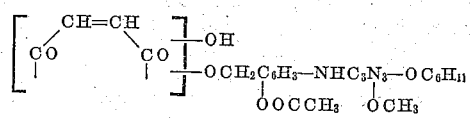

Triazine monomer XV-D

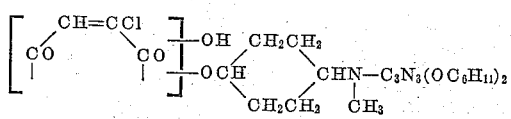

Triazine monomer XVI-D

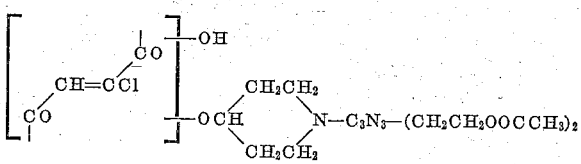

This invention will be more fully described by the following examples. The invention is not to be regarded, however, as restricted in any way by these examples and they are to serve merely as illustrations. In these examples and throughout the specification, "parts" and "percentages" shall mean parts by weight and percentages by weight unless specifically provided otherwise.

EXAMPLE I-e

*Preparation of Triazine Monomer*

Acrylyl chloride (18.1 parts) in 50 parts of diethyl ether is added slowly and with stirring to a mixture of 40.2 parts of 2,4-dimethoxy-6-(beta-hydroxy-ethoxy)-1,3,5-triazine and 150 parts of diethyl ether containing 37 parts of tributyl amine in a flask equipped for reflux. Upon completion of the addition of the acid chloride, the mixture is refluxed for approximately one-half hour and allowed to cool to room temperature, after which it is washed with water to remove the amine hydrochloride. The ether is then evaporated and the product again washed with water and recrystallized from acetone-water mixtures. There is obtained 2,4-dimethoxy-6-(beta-acryloxy-ethoxy)-1,3,5-triazine. Ultimate analyses for carbon, hydrogen, and nitrogen and molecular weight determination give values of 47.12%, 5.11%, 16.47% and 257.1, respectively, all of which values are in close agreement with the theoretical values.

Substitution of an equivalent quantity of methacrylyl chloride for its homolog in the foregoing procedure, yields the corresponding triazine monomer. Ultimate analyses and molecular weight determination give 49.21% carbon, 5.56% hydrogen, 15.63% nitrogen and molecular weight of 267.3, all of which values agree closely with the theoretical values for 2,4-dimethoxy-6-(beta-methacryloxy-ethoxy)-1,3,5-triazine. The corresponding chloracrylic derivative can be similarly prepared by use of chloracrylyl chloride.

Various other triazine monomers of this invention can be prepared by the foregoing procedure using the appropriate acrylic and triazine intermediates. For example, the following monomers prepared accordingly are identified by the analyses and molecular weights indicated, all of which check closely with the theoretical values:

(a) 2,4 - dimethoxy - 6 - (gamma-acryloxy-propoxy)-1,3,5 - triazine, with carbon, hydrogen, nitrogen and molecular weight values of 49.06%, 5.51%, 15.58% and 270.3, respectively;

(b) 2,4 - diphenoxy - 6 - (beta-acryloxy-ethoxy)-1,3,5-triazine, with carbon, hydrogen, nitrogen and molecular weight values of 63.34%, 4.52%, 11.12% and 381.2, respectively;

(c) 2,4 - diethoxy - 6 - (beta-methacryloxy-ethoxy)-1,3,5-triazine, with carbon, hydrogen, nitrogen and molecular weight values of 48.33%, 7.02%, 15.45% and 274.8, respectively;

(d) 2,4 - diisopropoxy - 6 - (6-chloracryloxy-n-hexoxy)-1,3,5-triazine, with carbon, hydrogen, nitrogen, chlorine and molecular weight values of 53.84%, 7.06%, 10.52%, 8.89% and 403.4, respectively;

(e) 2,4 - bis(beta-fluoro-ethoxy) - 6 - (4 - acryloxy-cyclohexoxy)-1,3,5-triazine, with carbon, hydrogen, nitrogen, fluorine and molecular weight values of 51.48%, 5.72%, 11.37%, 10.27% and 375.2, respectively.

Other methods of preparing the triazine monomers of this invention can be used. For example, the acrylic acid anhydride, as well as the corresponding alpha-methyl (methacrylic) and alpha-chloro (chloroacrylic) homologs can be used, according to well-known techniques for producing esters, with appropriate triazinyl alcohols to give desired triazine monomers. In certain cases, the triazine monomer can also be prepared by reacting an ester, such as methylacrylate, with a triazinyl alcohol to give the corresponding triazine monomer by displacement of methyl alcohol. In other cases, where a stable alcohol ester can be isolated, such as $CH_2=CHCOOCH_2CH_2OH$, it can be reacted with a cyanuric chloride derivative

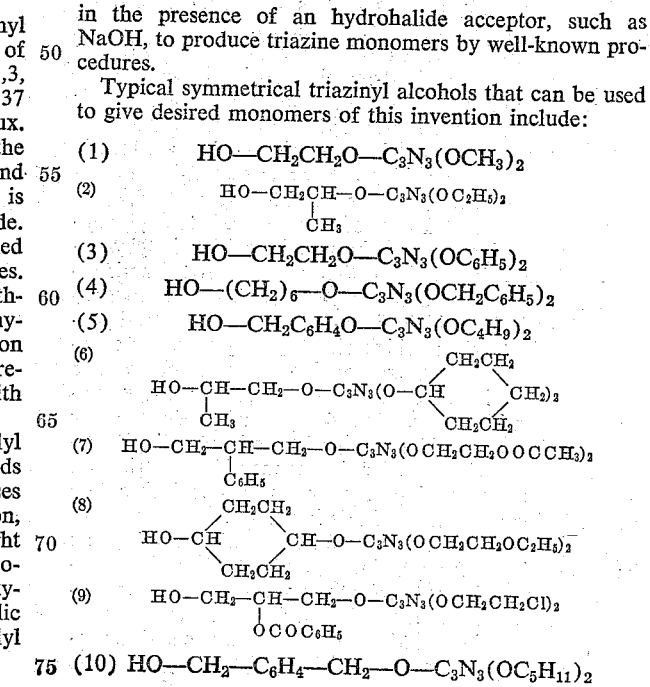

in the presence of an hydrohalide acceptor, such as NaOH, to produce triazine monomers by well-known procedures.

Typical symmetrical triazinyl alcohols that can be used to give desired monomers of this invention include:

(1) $HO-CH_2CH_2O-C_3N_3(OCH_3)_2$ (2) $HO-CH_2CH-O-C_3N_3(OC_2H_5)_2$
       |
       $CH_3$ (3) $HO-CH_2CH_2O-C_3N_3(OC_6H_5)_2$ (4) $HO-(CH_2)_6-O-C_3N_3(OCH_2C_6H_5)_2$ (5) $HO-CH_2C_6H_4O-C_3N_3(OC_4H_9)_2$ (6) 
$$HO-CH-CH_2-O-C_3N_3(O-CH\underset{CH_2CH_2}{\overset{CH_2CH_2}{\diagup\diagdown}}CH_2)_2$$
   |
   $CH_3$ (7) $HO-CH_2-CH-CH_2-O-C_3N_3(OCH_2CH_2OOCCH_3)_2$
         |
         $C_6H_5$ (8) $HO-CH\underset{CH_2CH_2}{\overset{CH_2CH_2}{\diagup\diagdown}}CH-O-C_3N_3(OCH_2CH_2OC_2H_5)_2$ (9) $HO-CH_2-CH-CH_2-O-C_3N_3(OCH_2CH_2Cl)_2$
          |
          $OCOC_6H_5$

(10) $HO-CH_2-C_6H_4-CH_2-O-C_3N_3(OC_5H_{11})_2$

(11)  $HO-CH_2-C_6H_3-O-C_3N_3(OCH_2CH_2C_6H_4Cl)_2$
      $\quad\quad\quad\quad\quad |$
      $\quad\quad\quad\quad\quad Cl$

(12)  $HO-CH_2-C_5H_{10}-CH_2-O-C_3N_3(OC_6H_4CH_3)_2$

The various triazine monomers used hereinafter in the examples have the following structures, in which $C_3N_3$ represents the trivalent symmetrical triazine nucleus:

Triazine monomer III-E $\quad CH_2=CHCOOCH_2CH_2O-C_3N_3(OCH_3)_2$

Triazine monomer IV-E $CH_2=CH-COOCH_2CH_2CH_2O-C_3N_3(OC_2H_5)_2$

Triazine monomer VI-E $\quad\quad\quad CH_3$
$\quad\quad\quad\ |$
$\quad CH_2=C-COOCH_2CH_2O-C_3N_3(OCH_3)_2$ Triazine monomer VII-E $\quad\quad\quad Cl$
$\quad\quad\quad\ |$
$\quad CH_2=C-COOCH_2CH_2O-C_3N_3(OCH_3)_2$ Triazine monomer VIII-E $\quad CH_2=CHCOOCH_2CH_2O-C_3N_3(OCH_2CH_2OCH_3)$ Triazine monomer IX-E $\quad\quad CH_3 \quad\quad\quad CH_2CH_2$
$\quad\quad |\quad\quad\quad\quad /\quad\quad\backslash$
$CH_2=C-COOCH\quad\quad CH-O-C_3N_3(OCH_3)_2$
$\quad\quad\quad\quad\quad\quad\backslash\quad\quad /$
$\quad\quad\quad\quad\quad\quad\ CH_2CH_2$ Triazine monomer X-E $\quad\quad\quad\quad\quad\quad\quad\quad\quad OCH_3$
$\quad\quad\quad\quad\quad\quad\quad\quad\quad\ |$
$CH_2=CH-COOCH_2C_6H_4-O-C_3N_3-OCH_2C_6H_5$ Triazine monomer XI-E $CH_2=CH-COO(CH_2)_6-O-$
$\quad\quad\quad\quad\quad\quad\quad\quad C_3N_3(OCH_2CH_2OOCCH_3)_2$ Triazine monomer XII-E $\quad\quad\quad\quad\quad\quad CH_2CH_2$
$\quad\quad\quad\quad\quad\quad /\quad\quad\backslash$
$CH_2=CHCOOCH\quad\quad CH-O-C_3N_3(OC_6H_4Cl)_2$
$\quad\quad\quad\quad\quad\quad\backslash\quad\quad /$
$\quad\quad\quad\quad\quad\quad\ CH_2CH$
$\quad\quad\quad\quad\quad\quad\quad\quad\quad\ |$
$\quad\quad\quad\quad\quad\quad\quad\quad\quad\ Cl$ Triazine monomer XIII-E $CH_2=CHCOOCH_2-CH-CH_2-O-C_3N_3(OCH_2CH_2OC_6H_5)_2$
$\quad\quad\quad\quad\quad\quad\quad\ |$
$\quad\quad\quad\quad\quad\quad\quad OC_6H_5$ Triazine monomer XIV-E $CH_2=CHCOOCH_2-CH-O-C_3N_3(OCH_2CH_2F)_2$
$\quad\quad\quad\quad\quad\quad\ |$
$\quad\quad\quad\quad\quad\quad C_6H_4CH_3$ Triazine monomer XV-E $CH_2=CHCOO(CH_2)_8-O-C_3N_3(OCH_2CH_2OC_6H_5)_2$ Triazine monomer XVI-E $CH_2=CHCOOCH_2CH-O-C_3N_3(OCH_3)_2$
$\quad\quad\quad\quad\quad\ |$
$\quad\quad\quad\quad\quad CH_2OOCCH_3$

EXAMPLE I-f

*Preparation of Triazine Monomer*

Acrylyl chloride (18.1 parts) in 150 parts of diethyl ether is added slowly and with stirring to a mixture of 39.8 parts of 2,4-dimethoxy-6-(beta-amino-ethylamino)-1,3,5-triazine and 150 parts of diethyl ether containing 37 parts of tributyl amine in a flask equipped for reflux. Upon completion of the addition of the acid chloride, the mixture is refluxed for approximately one-half hour and allowed to cool to room temperature, after which it is washed with water to remove the amine hydrochloride. The ether is then evaporated and the product again washed with water and recrystallized from acetone-water mixtures. There is obtained 2,4-dimethoxy-6-(beta-acryl- amido-ethylamino)-1,3,5-triazine. Ultimate analyses for carbon, hydrogen, and nitrogen and molecular weight determination gives values of 47.58%, 5.95%, 27.68% and 255.6, respectively, all of which values are in close agreement with the theoretical values.

Substitution of an equivalent quantity of methacrylyl chloride for its homolog in the foregoing procedure, yields the corresponding triazine monomer. Ultimate analyses and molecular weight determination give 49.53% carbon, 6.34% hydrogen, 26.25% nitrogen and molecular weight of 268.7, all of which values agree closely with the theoretical values for 2,4-dimethoxy-6-(beta-methacrylamido-ethylamino)-1,3,5-triazine. The corresponding chloracrylic derivative can be similarly prepared by use of chloracrylyl chloride.

The various other triazine monomers of this invention can be prepared by the foregoing procedure using the appropriate acrylic and triazine intermediates. For example, the following monomers prepared accordingly are identified by the analyses and molecular weights indicated, all of which check closely with the theoretical values:

(a) 2,4 - diethoxy - 6 - (beta - acrylamido - ethylamino)-1,3,5-triazine, with carbon, hydrogen, nitrogen and molecular weight values of 51.33%, 6.74%, 24.95% and 282.3, respectively;

(b) 2,4 - diisopropoxy - 6 - (beta - chloracrylamido - p-ethylphenylamino)1,3,5-triazine, with carbon, hydrogen, nitrogen, chlorine and molecular weight values of 57.34%, 6.22%, 16.74%, 8.43% and 421.2, respectively;

(c) 2,4 - diphenoxy - 6 - (para - methacrylamido-phenylamino)-1,3,5-triazine, with carbon, hydrogen, nitrogen and molecular weight values of 68.44%, 4.75%, 16.02% and 437.3, respectively;

(d) 2,4 - bis - (cyclohexoxy) - 6 - [6 - (N - methyl-acrylamido)-N-methyl-n-hexylamino] - 1,3,5 - triazine, with carbon, hydrogen, nitrogen and molecular weight values of 65.85%, 9.03%, 14.86% and 471.8, respectively;

(e) 2,4 - dimethoxy - 6 - (N - acrylamido - N' - piperazino)-1,3,5-triazine, with carbon, hydrogen, nitrogen and molecular weight values of 49.07%, 6.15%, 28.83% and 292.7, respectively.

Other methods of preparing the triazine monomers of this invention can be used. For example, the acrylic acid anhydride, as well as the corresponding alpha-methyl (methacrylic) and alpha-chloro (chloroacrylic) homologs can be used, according to well-known techniques for producing amides, with appropriate triazinyl amines to give desired triazine monomers. In certain cases, the triazine monomer can also be prepared by reacting an amide, such as N-N-dimethyl-acrylamide, with a triazinyl amine to give the corresponding triazine monomer by displacement of dimethyl amine. In other cases, where a stable amino-amide of acrylic acid can be isolated, such as $CH_2=CHCONHCH_2CH_2NHCH_3$, it can be reacted with a cyanuric chloride derivative $$\begin{array}{c}OR\\|\\C\\ /\ \backslash\\N\quad N\\||\quad\quad||\\RO-C\quad C-Cl\\ \backslash\ /\\N\end{array}$$

in the presence of an hydrohalide acceptor, such as NaOH, to produce triazine monomers by well-known procedures.

Typical triazine amines that can be used to give desired monomers of this invention include:

(1) $\quad NH_2-CH_2CH_2N-C_3N_3(OCH_3)_2$
$\quad\quad\quad\quad\quad\quad\quad\quad\ |$
$\quad\quad\quad\quad\quad\quad\quad\ CH_3$ (2) $\quad NH-CH_2CH_2NH-C_3N_3(OC_2H_5)_2$ (3) $\quad NH_2CH_2CH_2NH-C_3N_3(OC_6H_5)_2$ (4) $CH_3NH(CH_2)_6NH-C_3N_3(OCH_2C_6H_5)_2$ (5) $C_6H_5NHCH_2-CH-N(OC_4H_9)_2$
                            $CH_3$  $CH_3$ (6) $NH_2-CHCH_2NH-C_3N_3(O-C_6H_{11})_2$
                 $CH_3$ (7) $NH_2CH_2CHNH-C_3N_3(OCH_2CH_2OCOCH_3)_2$
                   $C_6H_5$ (8) $NH_2-C_6H_{10}-NH-C_3N_3(OCH_2CH_2OC_2H_5)_2$ (9) $NH_2CH_2CHCH_2NH-C_3N_3(OCH_2CH_2Cl)_2$
                   $OCOC_6H_5$

(10) $NH_2-C_6H_4-C_3N_3(OC_5H_{10}F)_2$

(11) $\begin{array}{c} CH_2CH_2 \\ NH \quad\quad N-C_3N_3(OCH_2CH_2C_6H_4Cl)_2 \\ CH_2CH_2 \end{array}$

(12) $\begin{array}{c} CH_2CH_2 \\ NH_2-CH \quad\quad N-C_3N_3(OC_6H_4CH_3)_2 \\ CH_2CH_2 \end{array}$ Various triazine monomers used hereinafter the examples have the following formulas, in which $C_3N_3$ represents the trivalent symmetrical triazine nucleus:

Triazine monomer III-F $$CH_2=CHCONHCH_2CH_2NH-C_3N_3(OCH_2)_2$$

Triazine monomer IV-F $$\underset{\underset{CH_3}{|}}{CH_2=CHCONHCH_2CH_2NH}-C_3N_3(OCH_3)_2$$

Triazine monomer VI-F $$\underset{\underset{Cl}{|}}{CH_2=C-CONHCH_2CH_2NH}-C_3N_3(OCH_3)_2$$

Triazine monomer VII-F $$CH_2=CHCONHCH_2CH_2NH-C_3N_3(OC_6H_5)_2$$

Triazine monomer VIII-F $$\underset{\underset{CH_3}{|}}{CH_2=CCONH(CH_2)_6NH}-C_3N_3(OCH_3)$$

Triazine monomer IX-F $$CH_2=CHCON\begin{array}{c}CH_2CH_2\\ \quad\quad N-C_3N_3(OC_6H_5)_2 \\ CH_2CH_2\end{array}$$

Triazine monomer X-F $$CH_2=CH-CONHCH_2CH_2NH-\underset{\underset{OC_4H_9}{|}}{\overset{\overset{OCH_3}{|}}{C_3N_3}}$$

Triazine monomer XI-F $$CH_2=CH-CONHC_6H_4NH-C_3N_3(OC_6H_{11})_2$$

Triazine monomer XII-F $$CH_2=CHCONHCH_2CH-\underset{\underset{OCOCH_3}{|}}{\overset{\overset{C_6H_5CH_3}{|}}{N}}-C_3N_3(OCH_2C_6H_5)_2$$

Triazine monomer XIII-F $$CH_2=CH-CONH-CH\begin{array}{c}CH_2CH_2\\ \quad\quad N-C_3N_3(OC_6H_4Cl)_2 \\ CH_2CH_2\end{array}$$

Triazine monomer XIV-F $$CH_2CHCONHCH_2C_6H_4CH_2\\-C_3N_3(OCH_2CH_2OCOCH_3)_2$$

Triazine monomer XV-F $$\underset{\underset{CH_2CH_2OC_6H_5}{|}}{CH_2=CHCONHCH_2CH_2N}-C_3N_3(OCH_2CH_2OC_6H_5)_2$$

Triazine monomer XVI-F $$\underset{\underset{CH_2F}{|}}{CH_2=CHCONHCH_2CH_2}-C_3N_3(OCH_2CH_2F)_2$$

EXAMPLE I-q

*Preparation of Triazine Monomer*

Acrylyl chloride (18,1 parts) in 150 parts of diethyl ether is added slowly and with stirring to a mixture of 40 parts of 2,4-dimethoxy-6-(beta-amino-ethoxy)-1,3,5-triazine and 150 parts of diethyl ether containing 37 parts of tributyl amine in a flask equipped for reflux. Upon completion of the addition of the acid chloride, the mixture is refluxed for approximately one-half hour and allowed to cool to room temperature, after which it is washed with water to remove the amine hydrochloride. The ether is then evaporated and the product again washed with water and recrystallized from acetone-water mixtures. There is obtained 2,4-dimethoxy-6-(beta-acrylamido-ethoxy)-1,3,5-triazine. Ultimate analyses for carbon, hydrogen, nitrogen and molecular weight determination give values of 48.12%, 4.04%, 22.43% and 252.2, respectively, all of which values are in close agreement with the theoretical values.

Substitution of an equivalent quantity of methacrylyl chloride for its homolog in the foregoing procedure, yields the corresponding triazine monomer. Ultimate analyses and molecular weight determination give 49.33% carbon, 6.01% hydrogen, 20.95% nitrogen and molecular weight of 271.2, all of which values agree closely with the theoretical values for 2,4-dimethoxy-6-(beta-methacrylamido-ethoxy)-1,3,5-triazine. The corresponding chloracrylic derivation can be similarly prepared by use of chloracrylyl chloride.

Various other triazine monomers of this invention can be prepared by the foregoing procedure using the appropriate acrylic and triazine intermediates. For example, the following monomers prepared accordingly are identified by the analyses and molecular weights indicated, all of which check closely with the theoretical values:

(*a*) 2,4 - diethoxy - 6 - (beta - acrylamido-ethoxy) - 1,3,5-triazine, with carbon, hydrogen, nitrogen and molecular weight values of 51.24%, 6.42%, 19.89% and 284.3, respectively;

(*b*) 2,4-diethoxy-6(6-acrylamido-n-hexoxy)-1,3,5-triazine, with carbon, hydrogen, nitrogen and molecular weight value of 56.84%, 7.72%, 16.61% and 340.2, respectively;

(*c*) 2,4-diisopropoxy-6-(beta-chloracrylamido-ethoxy)1,3,5-triazine, with carbon, hydrogen, nitrogen, chloro and molecular weight values of 48.73%, 6.06%, 16.27%, 10.26% and 347.2, respectively;

(*d*) 2,4-di(cyclohexoxy)-6-(gamma-methacrylamido-propoxy)-1,3,5-triazine, with carbon, hydrogen, nitrogen and molecular weight values of 63.24%, 8.15%, 13.40% and 420.2, respectively;

(*e*) 2,4 - bis - (beta - methoxy - ethoxy) - 6 - beta - (N-methyl-acrylamido)-ethoxy-1,3,5-triazine, with carbon, hydrogen, nitrogen and molecular weight values of 50.63%, 6.72%, 17.77% and 353.9, respectively.

Other methods of preparing the triazine monomers of this invention can be used. For example, the acrylic acid anhydride, as well as the corresponding alpha-methyl (methacrylic) and alpha-chloro (chloroacrylic) homologs can be used, according to well-known techniques for producing amides, with appropriate triazinyl amines to give desired triazine monomers. In certain cases, the triazine monomer can also be pepared by reacting an amide, such as N,N-dimethyl-acrylamide, with a triazinyl etheramine to give the corresponding triazine monomer by displacement of dimethylamine. In other cases, where a stable alcohol amide of acrylic acid can be isolated, such as $CH_2=CH—CONHCH_2CH_2OH$, it can be reacted with a cyanuric chloride derivative

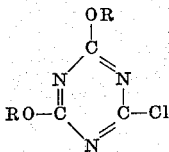

in the presence of an hydrohalide acceptor, such as NaOH, to produce triazine monomers by well-known procedures.

Typical triazinyl amines that can be used to give desired monomers of this invention include:

(1) $NH_2—CH_2CH_2O—C_3N_3(OCH_3)_2$ (2) $CH_3—NH—CH_2CH(CH_3)—O—C_3N_3(OC_2H_5)_2$ (3) $C_6H_5—NH—CH_2CH_2—O—C_3N_3(OC_6H_5)_2$ (4) $NH_2—(CH_2)_6—O—C_3N_3(OCH_2C_6H_5)_2$ (5) $NH_2—CH_2C_6H_4O—C_3N_3(OC_4H_9)_2$ (6) $NH_2—CH—CH_2—O—C_3N_3(O—C_6H_{11})_2$
$\quad\quad\;\; |$
$\quad\quad\; CH_3$ (7) $NH_2—CH_2—CH(C_6H_5)—CH_2—O—C_3N_3(OCH_2CH_2OOCCH_3)_2$ (8) $NH_2—C_6H_{10}—O—C_3N_3(OCH_2CH_2OC_2H_5)_2$ (9) $NH_2—CH_2—CH(OCOC_6H_5)—CH_2—O—C_3N_3(OCH_2CH_2Cl)_2$

(10) $NH_2—C_6H_4—O—C_3N_3(OC_5H_{11})_2$

(11) $NH_2—CH_2—C_6H_3(Cl)O—C_3N_3(OCH_2CH_2C_6H_4Cl)_2$

(12) $NH_2—CH_2—C_5H_{10}—CH_2—O—C_3N_3(OC_6H_4CH_3)_2$

Various triazine monomers used hereinafter in the examples have the following structural formulas, in which $C_3N_3$ represents the trivalent symmetrical triazine nucleus:

Triazine monomer III-G $CH_2=CHCONHCH_2CH_2O—C_3N_3(OCH_3)_2$

Triazine monomer IV-G $\quad\quad\; CH_3$
$\quad\quad\;\; |$
$CH_2=C—CONHCH_2CH_2O—C_3N_3(OCH_3)_2$ Triazine monomer VI-G $\quad\quad\; Cl$
$\quad\quad\; |$
$CH_2=C—CONHCH_2CH_2O—C_3N_3(OCH_3)_2$ Triazine monomer VII-G $CH_2=CHCONHCH_2CH_2O—C_3N_3(OC_6H_5)_2$ Triazine monomer VIII-G $\quad\quad\; CH_3$
$\quad\quad\;\; |$
$CH_2=CONH(CH_2)_8—O—C_3N_3(OC_2H_5)_2$ Triazine monomer IX-G $CH_2=CHCONHC_6H_4—C_3N_3(OC_4H_9)_2$ Triazine monomer X-G $\quad\quad\quad\quad\quad\quad\quad\; OCH_3$
$\quad\quad\quad\quad\quad\quad\quad\; |$
$CH_2=CH—CONHCH_2C_6H_4—O—C_3N_3—OCH_2C_6H_5$ Triazine monomer XI-G $CH_2=CH—CONH—C_6H_{10}—O—C_3N_3(OCH_2CH_2OOCCH_3)_2$ Triazine monomer XII-G $CH_2=CHCONH—C_6H_9(Cl)—O—C_3N_3(OC_6H_4Cl)_2$ Triazine monomer XIII-G $CH_2=CHCON(CH_3)—CH_2CH(OC_6H_5)—CH_2—O—C_3N_3(OCH_2CH_2OC_6H_5)_2$ Triazine monomer XIV-G $CH_2=CHCONH—CH_2—CH(C_6H_4CH_3)—O—C_3N_3(OCH_2CH_2F)_2$ Triazine monomer XV-G $CH_2=CHCONH—CH_2CH(CH_2OOCCH_3)—O—C_3N_3(OCH_3)_2$ Triazine monomer XVI-G

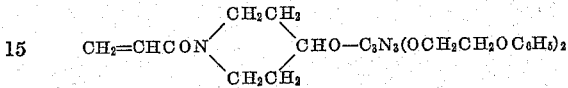

EXAMPLE I-h

Preparation of Triazine Monomers (a) Itaconic anhydride (11.2 parts) in 150 parts of benzene is added slowly and with stirring to a mixture of 20.1 parts of 2,4-dimethoxy-6-(beta-hydroxyethoxy)-1,3,5-triazine and 150 parts of diethyl ether. Upon completion of the addition of the anhydride, the mixture is refluxed for approximately one hour, after which it is allowed to cool to room temperature and is washed with water. The ether and benzene are them evaporated and the ester is recrystallized from acetane-water mixtures. There is obtained the itaconic acid monoester of the above triazine compound. Ultimate analyses for carbon, hydrogen, and nitrogen, and molecular weight determination, give values which are in close agreement with the theoretical values.

Substitution of equivalent quantities of the various other triazinyl alcohols described above for the one used in the foregoing procedure yields various monoesters of itaconic acid of this invention. These are identified by ultimate analyses and molecular weight determinations as above. These mono-acid esters can be used as such or can be converted to alkyl esters by reacting their sodium salts in the standard manner, with dialkyl sulfates, as for example with dimethyl or diethyl sulfate to produce the corresponding methyl, ethyl, or other alkyl esters. These esters may also be prepared as in the following procedure (b).

(b) Monomethyl itaconyl monochloride (16.3 parts) in 50 parts of diethyl ether is added slowly and with stirring to a mixture of 20.1 parts of 2,4-dimethoxy-6-(beta-hydroxyethoxy)-1,3,5-triazine and 150 parts of diethyl ether containing 18.5 parts of tributylamine. Upon completion of the addition of the acid chloride, the mixture is refluxed for approximately one half hour, then allowed to cool to room temperature and washed with water is remove the amine hydrochloride. The ether is then evaporated, the ester again washed with water and the product recrystallized from acetone-water mixtures. There is obtained the monomethyl itaconic ester of 2,4-dimethoxy-6-(beta-hydroxyethoxy)-1,3,5 - triazine. Ultimate analyses for carbon, hydrogen, and nitrogen, and molecular weight determination, give values which check closely with the theoretical values. Substitution of equivalent quantities of the various monoesters and of various triazinyl alcohols, as described above, for the monoester and triazinyl alcohol of the foregoing procedure yields various itaconic mixed esters of this invention. These are characterized by ultimate analyses and molecular weight determinations as above.

(c) In place of the mono-acid chloride of (b), there is used 16.75 parts of itaconic dichloride, together with 40.2 parts of 2,4-dimethoxy-6-(beta-hydroxyethoxy)-1,3,5-triazine and 37 parts of dibutylamine, and according to the same procedure for the itaconyl monochloride, there is obtained the itaconic diester of this triazinyl alcohol. Ultimate analyses for carbon, hydrogen, and nitrogen, and molecular weight determination, give values which check closely with the theoretical values. When the various other triazinyl alcohols described above are substituted respectively in equivalent quantities in this foregoing procedure, the corresponding itaconic diesters are obtained.

(d) In place of the monomethyl itaconyl monochloride of (b), there is used an equivalent amount of mono-(dimethylamido)-itaconyl monochloride. (This monoamide can be prepared by reacting, mole per mole, dimethylamine and itaconic acid anhydride and subsequently converting the free acid group of the resulting mono-(dimethylamido)-itaconic monoacid to an acid chloride group by the ordinary methods of converting acids to acyl chlorides, such as for example, by reacting with thionyl chloride.) The procedure of (b) is followed to produce mono-(dimethylamido)-itaconic monoester of 2,4-dimethoxy-6-(beta-hydroxyethoxy)-1,3,5-triazine. Ultimate analyses for carbon, hydrogen, and nitrogen, and molecular weight determination, show values which check closely with the theoretical values. Substitution of various other monoamides of itaconic acid, including the morpholino, piperidyl, and piperazinyl monoamides, and of various other triazinyl alcohols, as described above, for the monoamide and triazinyl alcohol of the foregoing procedure yields various itaconic amide ester triazine monomers of this invention.

The following compounds of this invention, prepared according to the foregoing procedures, show ultimate analyses and molecular weight values which check closely with theoretical values: morpholino monoamide of itaconic monoester of 2,4-diethoxy-6-(gamma-hydroxypropoxy)-1,3,5-triazine; piperidyl monoamide of itaconic monoester of 2,4-dibutoxy-6-(gamma-hydroxybutoxy)-1,3,5-triazine; monobutyl itaconic ester of 2,4-dipropoxy-6-(beta-hydroxy-ethylphenoxy)-1,3,5-triazine; piperazinyl monoamide of itaconic monoester of 2,4-diphenoxy-6-(4-hydroxycyclohexyl)-1,3,5-triazine.

Other methods of preparing the triazine monomers of this invention can be used. For example, ester interchange can be used to replace a lower molecular weight alcohol, such as methyl from an itaconate ester, by the appropriate triazinyl alcohol. In addition the appropriate itaconate ester of a dihydric A compound, such as itaconic acid monoester of ethylene glycol with an appropriate cyanuric chloride derivative, $Cl-C_3N_3(OR)_2$.

Various triazine monomers used hereinafter in the examples have the following formulas in which $C_3N_3$ represents the trivalent symmetrical triazine nucleus:

Triazine monomer III-H

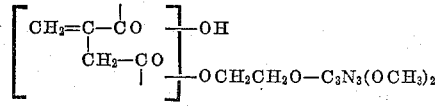

Triazine monomer IV-H

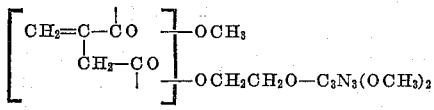

Triazine monomer VI-H

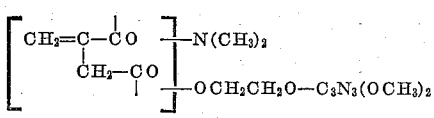

Triazine monomer VII-H

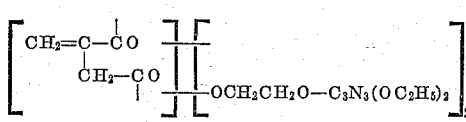

Triazine monomer VIII-H

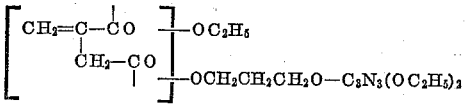

Triazine monomer IX-H

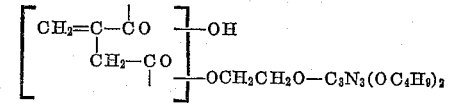

Triazine monomer X-H

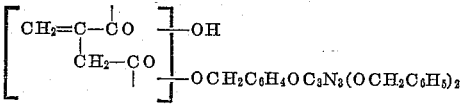

Triazine monomer XI-H

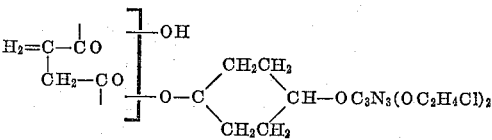

Triazine monomer XII-H

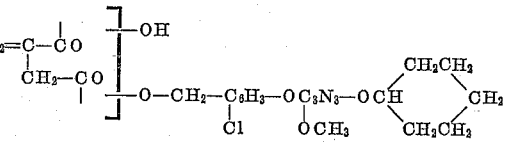

Triazine monomer XIII-H

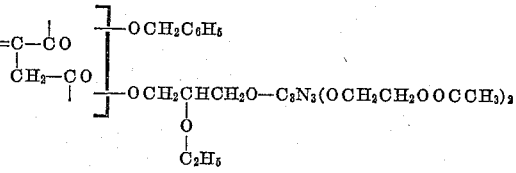

Triazine monomer XIV-H

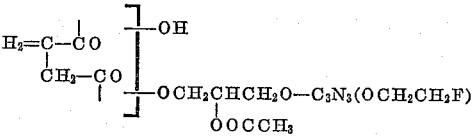

Triazine monomer XV-H

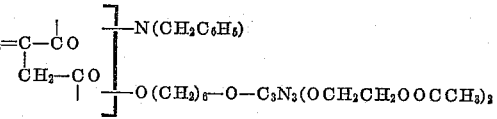

Triazine monomer XVI-H

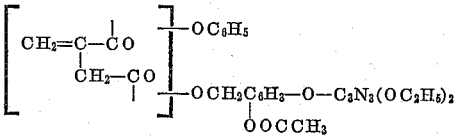

EXAMPLE I-i

*Preparation of Triazine Monomers*

(a) Itaconic anhydride (11.2 parts) in 150 parts of benzene is added slowly and with stirring to a mixture of 19.9 parts of 2,4-dimethoxy-6-(beta-aminoethylamino)-1,3,5-triazine and 150 parts diethyl ether. Upon completion of the addition of the anhydride, the mixture is refluxed for approximately one hour, after which it is allowed to cool to room temperature and is washed with water. The ether and benzene are then evaporated and the product is recrystallized from acetone-water mixtures. There is obtained the itaconic acid monoamide of the above triazine compound. Ultimate analyses for carbon, hydrogen, and nitrogen, and molecular weight determination give values which are in close agreement with the theoretical values.

Substitution of equivalent quantities of the various other triazinyl alcohols described above for the one used in the foregoing procedure yields various monoamides of itaconic acid of this invention. These are identified by ultimate analyses and molecular weight determinations as above. These monoacid monoamides can be used as such or can be converted to alkyl monoesters by reacting their sodium salts in the standard manner, with dialkyl sulfates, as for example with dimethyl or diethyl sulfate to produce the corresponding methyl, ethyl, or other alkyl esters. These esters may also be prepared as in the following procedure (b).

(b) Monomethyl itaconyl monochloride (16.3 parts) in 150 parts of diethyl ether is added slowly and with stirring to a mixture of 19.9 parts of 2,4-dimethoxy-6-(beta-aminoethylamino)-1,3,5-triazine and 150 parts of diethyl ether containing 18.5 parts of tributylamine. Upon completion of the addition of the acid chloride, the mixture is refluxed for approximately one-half hour, then allowed to cool to room temperature and washed with water to remove the amine hydrochloride. The ether is then evaporated, the product again washed with water and recrystallized from acetone-water mixtures. There is obtained the monomethyl itaconic ester-amide of 2,4 - dimethoxy - 6 - (beta-aminoethylamino)-1,3,5-triazine. Ultimate analyses for carbon, hydrogen, and nitrogen, and molecular weight determination give values which check closely with the theoretical values. Substitution of equivalent quantities of the various monoesters and of various triazinyl amines, as described above, for the monoester and triazinyl amine of the foregoing procedure yields various itaconic esteramides of this invention. These are characterized by ultimate analyses and molecular weight determinations as above.

(c) In place of the monoacid chloride of (b), there is used 16.75 parts of itaconic dichloride, together with 39.8 parts of 2,4-dimethoxy-6-(beta-aminoethylamino)-1,3,5-triazine and 37 parts of tributylamine, and according to the same procedure for the itaconyl monochloride, there is obtained the itaconic diamide of this triazinyl amine. Ultimate analyses for carbon, hydrogen, and nitrogen, and molecular weight determination give values which check closely with the theoretical values. When the various other triazinyl amines described above are substituted respectively in equivalent quantities in this foregoing procedure, the corresponding itaconic diamides are obtained.

(d) In place of the monomethyl itaconyl monochloride of (b), there is used an equivalent amount of mono-(dimethylamido)-itaconyl monochloride. (This monoamide can be prepared by reacting, mole per mole, dimethylamine and itaconic acid anhydride and subsequently converting the free acid group of the resulting mono-(dimethylamido)-itaconic monoacid to an acid chloride group by the ordinary methods of converting acids to acyl chlorides, such as, for example, by reacting with thionyl chloride.)

The procedure of (b) is followed to produce mono-(dimethylamido)-itaconic monoester of 2,4-dimethoxy-6 - (beta - aminoethylamino)-1,3,5-triazine. Ultimate analyses for carbon, hydrogen, and nitrogen, and molecular weight determination show values which check closely with the theoretical values. Substitution of various other monoamides of itaconic acid, including the morpholino, piperidyl, and piperazinyl monoamides, and of various other triazinyl amines, as described above, for the monoamide and triazinyl amine of the foregoing procedure yields various itaconic mixed diamide triazine monomers of this invention.

The following compounds of this invention prepared according to the foregoing procedures, show ultimate analyses and molecular weight values which check with the theoretical values: morpholino monoamide of itaconic monoamide of 2,4-diethoxy-(gamma-aminopropylamino)-1,3,5-triazine; piperidyl monoamide of itaconic monoamide of 2,4-dibutoxy-6-(gamma-aminobutylamino)-1,3,5-triazine; monobutyl itaconic ester of 2,4-dipropoxy - 6 - (beta-amino-ethylphenylamino)-1,3,5-triazine; piperazinyl monoamide of itaconic monoamide of 2,4-dimethoxy-6-(beta-aminoethyl-amino)-1,3,5-triazine.

Various other methods of preparing the triazine monomers of this invention can be used. For example, an appropriate triazinyl amine can be used to displace a simple amine, such as, for example, dimethyl amine from an itaconic-N,N-dimethylamine, etc. Aminoamides of itaconic acid, such as itaconic-NHCH$_2$CH$_2$NHCH$_3$ can also be reacted with an appropriate cyanuric chloride derivative, Cl—C$_3$N$_3$(OR)$_2$.

Various triazine monomers used hereinafter in the examples have the following formulas wherein C$_3$N$_3$ represents the trivalent symmetrical triazine nucleus:

Triazine monomer III–I

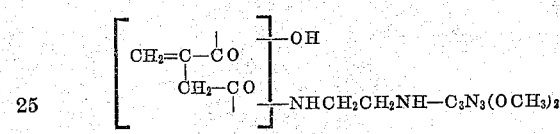

Triazine monomer IV–I

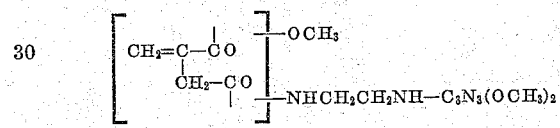

Triazine monomer VI–I

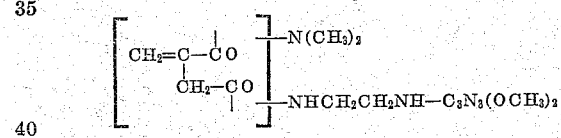

Triazine monomer VII–I

Triazine monomer VIII–I

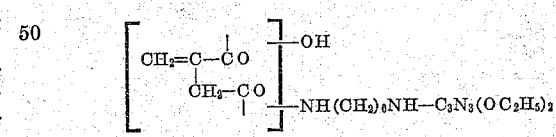

Triazine monomer IX–I

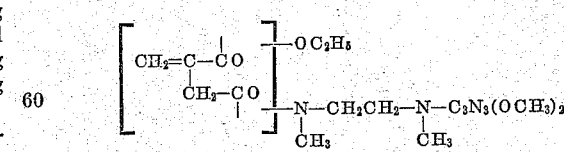

Triazine monomer X–I

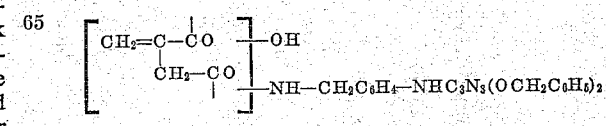

Triazine monomer XI–I

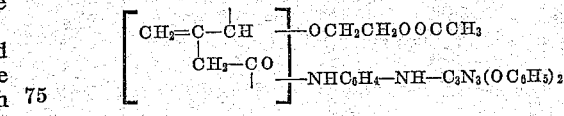

Triazine monomer XII–I

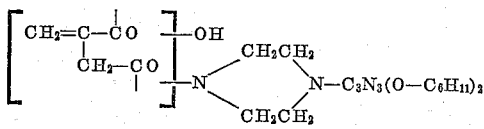

Triazine monomer XIII–I

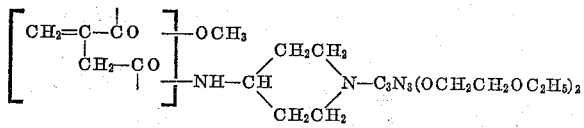

Triazine monomer XIV–I

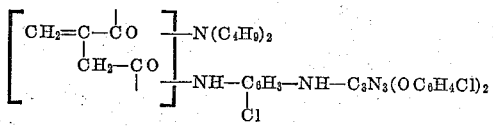

Triazine monomer XV–I

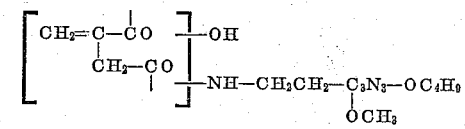

Triazine monomer XVII–I

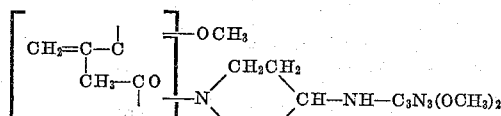

EXAMPLE I–j

*Preparation of Triazine Monomer*

(a) Itaconic anhydride (11.2 parts) in 150 parts of benzene is added slowly and with stirring to a mixture of 20 parts of 2,4-dimethoxy-6-(beta-aminoethoxy)-1,3,5-triazine and 150 parts of diethyl ether. Upon completion of the addition of the anhydride, the mixture is refluxed for approximately one hour, after which it is allowed to cool to room temperature and is washed with water. The ether and benzene are then evaporated and the product is recrystallized from acetone-water mixtures. There is obtained the itaconic acid monoamide of the above triazine compound. Ultimate analyses for carbon, hydrogen, and nitrogen, and molecular weight determination give values which are in close agreement with the theoretical values.

Substitution of equivalent quantities of the various other triazinyl amines described above for the one used in the foregoing procedure yields various amides of itaconic acid of this invention. These are identified by ultimate analyses and molecular weight determination as above. These acid monoamides can be used as such or can be converted to alkyl esters by reacting their sodium salts in the standard manner, with dialkyl sulfates, as for example with dimethyl or diethyl sulfate to produce the corresponding methyl, ethyl, or other alkyl esters. These esters may also be prepared as in the following procedure (b).

(b) Monomethyl itaconyl monochloride (16.3 parts) in 150 parts of diethyl ether is added slowly and with stirring to a mixture of 20 parts of 2,4-dimethoxy-6-(beta-aminoethoxy)-1,3,5-triazine and 150 parts of diethyl ether containing 18.5 parts of tributylamine. Upon completion of the addition of the acid chloride, the mixture is refluxed for approximately one-half hour, then allowed to cool to room temperature, and washed with water to remove the amine hydrochloride. The ether is then evaporated, the product again washed with water, and the product recrystallized from acetone-water mixtures. There is obtained the monomethyl ester of itaconic monoamide of 2,4-dimethoxy-6-(beta-aminoethoxy)-1,3,5-triazine. Ultimate analyses for carbon, hydrogen, and nitrogen, and molecular weight determination give values which check closely with the theoretical values. Substitution of equivalent quantities of various itaconic acid monoesters and of various triazinyl amines, as described above, for the monoester and triazinyl amine of the foregoing procedure yields various itaconic ester-amides of this invention. These are characterized by ultimate analyses and molecular weight determinations as above.

(c) In place of the mono-acid chloride of (b) there is used 16.75 parts of itaconic dichloride, together with 40 parts of 2,4-dimethoxy-6-(beta-aminoethoxy)-1,3,5-triazine and 37 parts of tributylamine, and according to the same procedure for the itaconyl monochloride, there is obtained the itaconic diamide of this triazinyl amine. Ultimate analyses for carbon, hydrogen, and nitrogen, and molecular weight determination give values which check closely with the theoretical values. When the various other triazinyl amines described above are substituted respectively in equivalent quantities in this foregoing procedure, the corresponding itaconic diamides are obtained.

(d) In place of the monomethyl itaconyl monochloride of (b), there is used an equivalent amount of mono-(dimethylamido)-itaconyl monochloride. (This monoamide can be prepared by reacting, mole per mole, dimethylamine and itaconic acid anhydride and subsequently converting the free acid group of the resulting mono-(dimethylamido)-itaconic monoacid to an acid chloride group by the ordinary methods of converting acids to acyl chlorides, such as, for example, by reacting with thionyl chloride.) The procedure of (b) is followed to produce mono-(dimethylamido)-itaconic monoamide of 2,4-dimethoxy-6-(beta-aminoethoxy)-1,3,5-triazine. Ultimate analyses for carbon, hydrogen, and nitrogen, and molecular weight determination show values which check closely with the theoretical values. Substitution of various other monoamides of itaconic acid, including the morpholino, piperidyl and piperazinyl monoamides, and of various other triazinyl amines, as described above, for the monoamide and triazinyl amine of the foregoing procedure yields various itaconic mixed diamide triazine monomers of this invention.

The following compounds of this invention, prepared according to the foregoing procedures show ultimate analyses and molecular weight values which check closely with the theoretical values: morpholino monoamide of itaconic monoamide of 2,4-dimethoxy-6-(gamma-aminopropoxy)-1,3,5-triazine; piperidyl monoamide of itaconic monoamide of 2,4-dibutoxy-6-(gamma-aminobutoxy)-1,3,5-triazine; monobutyl ester of itaconic monoamide of 2,4-dipropoxy-6-(beta-amino-ethylphenoxy)-1,3,5-triazine; piperazinyl monoamide of itaconic monoamide of 2,4-diphenoxy-6-(beta-aminoethoxy)-1,3,5-triazine.

Various other methods of preparing the triazine monomers of this invention can be used. For example, an appropriate triazinyl amine can be used to displace a simple amine such as, for example, dimethylamine from itaconic N,N-dimethyl-amide, etc. Alcohol amides of itaconic acid, such as itaconic

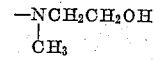

can also be reacted with an appropriate cyanuric chloride derivative, Cl—$C_3N_3(OR)_2$.

Various triazine monomers used hereinafter in the examples have the following formulas wherein $C_3N_3$ represents the trivalent symmetrical triazine nucleus:

Triazine monomer XIII–J

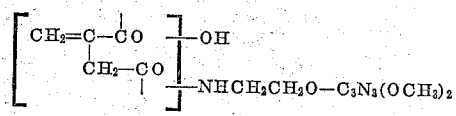

Triazine monomer IV-J
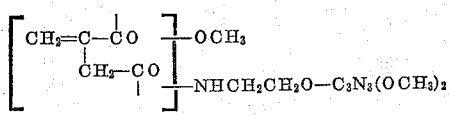

Triazine monomer VI-J
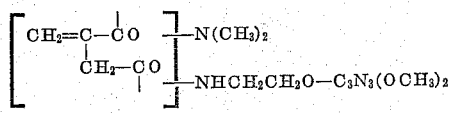

Triazine monomer VII-J

Triazine monomer VIII-J
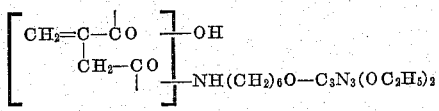

Triazine monomer IX-J
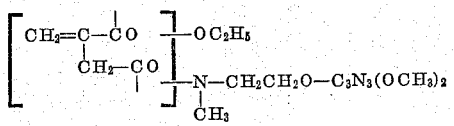

Triazine monomer X-J
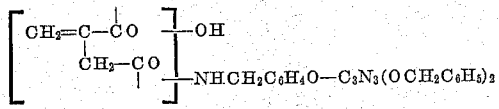

Triazine monomer XI-J
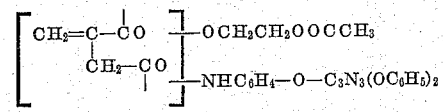

Triazine monomer XII-J
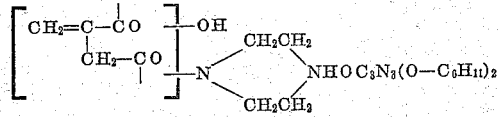

Triazine monomer XIII-J
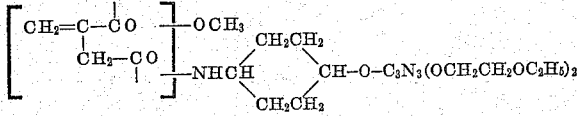

Triazine monomer XIV-J
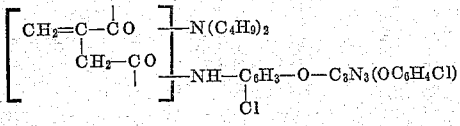

Triazine monomer XV-J
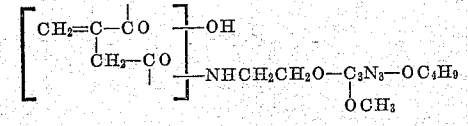

Triazine monomer XVI-J
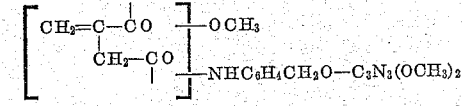

This invention will be more fully described by the following examples. The invention is not to be regarded, however, as restricted in any way by these examples, and they are to serve merely as illustrations. In these examples and throughout the specification, "parts" and "percentages" shall mean parts by weight and percentages by weight unless specifically provided otherwise.

EXAMPLE I-k

*Preparation of Triazine Monomer*

Beta-cyano-acrylyl chloride (23.1 parts) in 150 parts of diethyl ether is added slowly and with stirring to a mixture of 40.2 parts of 2,4-dimethoxy-6-(beta-hydroxyethoxy)-1,3,5-triazine and 150 parts of diethyl ether containing 37 parts of tributyl amine in a flask equipped for reflux. Upon completion of the addition of the acid chloride, the mixture is refluxed for approximately one-half hour and allowed to cool to room temperature, after which it is washed with water to remove the amine hydrochloride. The ether is then evaporated and the product again washed with water and recrystallized from acetone-water mixtures. There is obtained 2,4-dimethoxy-6-[beta-(beta-cyano-acryloxy)-ethoxy]-1,3,5-triazine. Ultimate analyses for carbon, hydrogen, and nitrogen and molecular weight determination give values of 47.23%, 4.31%, 20.12% and 278.2, respectively, all of which values are in close agreement with the theoretical values.

Substitution of an equivalent quantity of beta-cyano-methacrylyl chloride for its homolog in the foregoing procedure, yields the corresponding triazine monomer. Ultimate analyses and molecular weight determination give 49.03% carbon, 4.75% hydrogen, 18.97% nitrogen and molecular weight of 272.9, all of which values agree closely with the theoretical values for 2,4-dimethoxy-6-[beta-(beta-cyano-methacryloxy)-ethoxy]-1,3,5-triazine. The corresponding beta-cyano-chloracrylic derivative can be similarly prepared by use of beta-cyano-chloracrylyl chloride.

Various other triazine monomers of this invention can be prepared by the foregoing procedure using the appropriate acrylic and triazine intermediates. For example, the following monomers prepared accordingly are identified by the analyses and molecular weights indicated, all of which check closely with the theoretical values:

(a) 2,4-dimethoxy-6-[gamma-(beta-cyano-acryloxy)-propoxy]-1,3,5-triazine, with carbon, hydrogen, nitrogen and molecular weight values of 48.89%, 4.75%, 19.12% and 296.1, respectively;

(b) 2,4-diphenoxy-6-[beta-(beta-cyano-acryloxy)-ethoxy]-1,3,5-triazine, with carbon, hydrogen, nitrogen and molecular weight values of 62.46%, 3.94%, 13.87% and 405.8, respectively;

(c) 2,4-diethoxy-6-[beta-(beta-cyano-methacryloxy)-ethoxy]-1,3,5-triazine, with carbon, hydrogen, nitrogen and molecular weight values of 52.23%, 6.02%, 17.43% and 324.7, respectively;

(d) 2,4-diisopropoxy-6[6-(beta-cyano-chloracryloxy)-n-hexoxy]-1,3,5-triazine, with carbon, hydrogen, nitrogen, chlorine and molecular weight values of 52.43%, 6.54%, 13.47%, 8.56% and 418.3, respectively;

(e) 2,4-bis-(beta-fluoro-ethoxy)-6-[4-(beta-cyano-acryloxy)-cyclohexoxy]-1,3,5-triazine, with carbon, hydrogen, nitrogen, fluorine and molecular weight values of 51.32%, 5.04%, 14.08%, 9.58% and 401.2, respectively.

Other methods of preparing the triazine monomers of this invention can be used. For example, the beta-cyanoacrylic acid anhydride, as well as the corresponding beta-cyano-alpha-methyl (beta-cyano-methacrylic) and beta-cyano-alpha-chloro (beta-cyano-chloroacrylic) homologs can be used, according to well-known techniques for producing esters, with appropriate triazinyl alcohols to give desired triazine monomers. In certain cases, the triazine monomers can also be prepared by reacting an ester, such as methyl acrylate, with a triazinyl alcohol to give the corresponding triazine monomer by displacement of methyl alcohol. In other cases, where a stable alcohol ester can be isolated, such as $$CN-CH=CH-COOCH_2CH_2OH$$

it can be reacted with a cyanuric chloride derivative

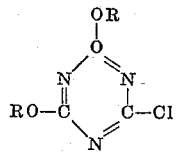

in the presence of an hydrohalide acceptor, such as NAOH, to produce triazine monomers by well-known procedures.

Typical symmetrical triazinyl alcohols that can be used to give desired monomers of this invention include:

(1) $HO-CH_2CH_2O-C_3N_3(OCH_3)_2$ (2) $HO-CH_2CH_2O-C_3N_3(OC_2H_5)_2$ (3) $HO-CH_2CH_2O-C_3N_3(OC_6H_5)_2$ (4) $HO-(CH_2)_6-O-C_3N_3(OCH_2C_6H_5)_2$ (5) $HO-CH_2C_6H_4O-C_3N_3(OC_4H_9)_2$ (6) 

(7) $HO-CH_2-CH-CH_2-O-C_3N_3(OCH_2CH_2OOCCH_3)_2$
      $\quad\quad\quad\; |$
      $\quad\quad\quad C_6H_5$ (8) 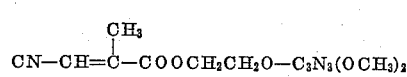

(9) $HO-CH_2-CH-CH_2-O-C_3N_3(OCH_2CH_2Cl)_2$
      $\quad\quad\quad\; |$
      $\quad\quad\quad OCOC_6H_5$

(10) $HO-CH_2-C_6H_4-CH_2-O-C_3N_3(OC_5H_{11})_2$

(11) $HO-CH_2-C_6H_3-O-C_3N_3(OCH_2CH_2C_6H_4Cl)_2$
       $\quad\quad\quad\; |$
       $\quad\quad\quad Cl$

(12) $HO-CH_2-C_5H_{10}-CH_2-O-C_3N_3(OC_6H_4CH_3)_2$

Various triazine monomers used hereinafter in the examples have the following structures, in which $C_3N_3$ represents the trivalent symmetrical triazine nucleus:

Triazine monomer III-K $$CN-CH=CHCOOCH_2CH_2O-C_3N_3(OCH_3)_2$$

Triazine monomer IV-K $$CN-CH=CH-COOCH_2CH_2CH_2O-C_3N_3(OCH_3)_2$$

Triazine monomer VI-K $$\begin{array}{c}CH_3\\|\\CN-CH=C-COOCH_2CH_2O-C_3N_3(OCH_3)_2\end{array}$$

Triazine monomer VII-K $$\begin{array}{c}Cl\\|\\CN-CH=C-COOCH_2CH_2O-C_3N_3(OCH_3)_2\end{array}$$

Triazine monomer VIII-K $$CN-CH=CH-COOCH_2CH_2O$$
$$\quad\quad\quad\quad\quad -C_3N_3(OCH_2CH_2OCH_3)_2$$

Triazine monomer IX-K

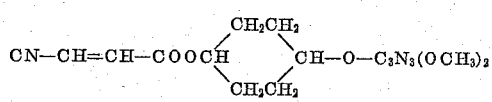

Triazine monomer X-K $$\begin{array}{c}\quad\quad\quad\quad\quad\quad OCH_3\\\quad\quad\quad\quad\quad\quad |\\CN-CH=CH-COOCH_2C_6H_4-O-C_3N_3-OCH_2C_6H_5\end{array}$$

Triazine monomer XI-K $$CN-CH=CH-COO(CH_2)_6-O$$
$$\quad\quad\quad\quad\quad\quad -C_3N_3(OCH_2CH_2OCOCH_3)_2$$

Triazine monomer XII-K

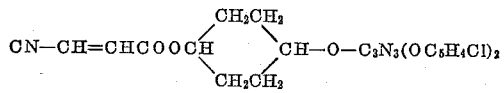

Triazine monomer XIII-K $$\begin{array}{c}CN-CH=CHCOOCH_2CH-CH_2O-C_3N_3(OCH_3CH_2OC_6H_5)_2\\|\\OC_6H_5\end{array}$$

Triazine monomer XIV-K $$\begin{array}{c}CN-CH=CHCOOCH_2-CH-O-C_3N_3(OCH_2CH_2F)_2\\|\\C_6H_4CH_3\end{array}$$

Triazine monomer XV-K $$CN-CH=CHCOO(CH_2)_8-O$$
$$\quad\quad\quad\quad\quad -C_3N_3(OCH_2CH_2OC_6H_5)_2$$

Triazine monomer XVI-K $$\begin{array}{c}CN-CH=CHCOOCH_2CH-O-C_3N_3(OCH_3)_2\\|\\CH_2OOCCH_3\end{array}$$

EXAMPLE I-*l*

*Preparation of Triazine Monomer*

Beta-cyano-acrylyl chloride (23.1 parts) in 150 parts of diethyl ether is added slowly and with stirring to a mixture of 39.8 parts of 2,4-dimethoxy-6-(beta-aminoethylamino)-1,3,5-triazine and 150 parts of diethyl ether containing 37 parts of tributyl amine in a flask equipped for reflux. Upon completion of the addition of the acid chloride, the mixture is refluxed for approximately one-half hour and allowed to cool to room temperature, after which it is washed with water to remove the amine hydrochloride. The ether is then evaporated and the product again washed with water and recrystallized from acetone-water mixtures. There is obtained 2,4-dimethoxy - 6 - [beta - (beta - cyano - acrylamido) - ethylamino]-1,3,5-triazine. Ultimate analyses for carbon, hydrogen, and nitrogen and molecular weight determination give values of 47.53%, 5.06%, 30.26%, and 280.2, respectively, all of which values are in close agreement with the theoretical values.

Substitution of an equivalent quantity of beta-cyano-methacrylyl chloride for its homolog in the foregoing procedure, yields the corresponding triazine monomer. Ultimate analyses and molecular weight determination give 49.36% carbon, 5.44% hydrogen, 28.83% nitrogen and molecular weight of 293.6, all of which values agree closely with the theoretical values for 2,4-dimethoxy-6 - [beta - (beta - cyano - methacrylamido) - ethylamino]-1,3,5-triazine. The corresponding chloracrylic derivative can be similarly prepared by use of beta-cyano-chloracrylyl chloride.

The various other triazine monomers of this invention can be prepared by the foregoing procedure using the appropriate acrylic and triazine intermediates. For example, the following monomers prepared accordingly are identified by the analyses and molecular weights indicated, all of which check closely with the theoretical values:

(*a*) 2,4 - diethoxy - 6 - [beta - (beta - cyano - acrylamido)-ethylamino]-1,3,5-triazine, with carbon, hydrogen, nitrogen and molecular weight values of 51.18%, 5.83%, 27.46% and 308.2, respectively;

(*b*) 2,4 - diisopropoxy - 6 - [beta - (beta - cyano - chloracrylamido)-p-ethylphenylamino]-1,3,5 - triazine, with carbon, hydrogen, nitrogen, chlorine and molecular weight values of 56.74%, 5.66%, 18.94%, 8.03% and 446.8, respectively;

(*c*) 2,4 - diphenoxy - 6 - [para - (beta - cyano - methacrylamido)-phenylamino]-1,3,5-triazine, with carbon, hydrogen, nitrogen and molecular weight values of 67.34%, 4.31%, 18.17% and 466.2, respectively;

(d) 1,3 - bis(cyclohexoxy) - 6 - [6 - (N - methyl - beta-cyano - acrylamido) - N - methyl - n - hexylamino]-1,3,5-triazine, with carbon, hydrogen, nitrogen and molecular weight values of 65.08%, 8.45%, 16.81% and 500.2, respectively;

(e) 2,4 - dimethoxy - 6 - (N - acrylamido - N' - piperazino)-1,3,5-triazine, with carbon, hydrogen, nitrogen and molecular weight values of 49.03%, 6.15%, 28.66% and 295.7, respectively.

Other methods of preparing the triazine monomers of this invention can be used. For example, the beta-cyano-acrylic acid anhydride, as well as the corresponding beta-cyano-alpha-methyl (beta-cyano-methacrylic) and beta-cyano-alpha-chloro (beta-cyano-chloracrylic) homologs can be used according to well-known techniques for producing amides, with appropriate triazinyl amines to give desired triazine monomers. In certain cases, the triazine monomer can also be prepared by reacting an amide, such as N,N-dimethyl-beta-cyano-acrylamide, with a triazinyl amine to give the corresponding triazine monomer by displacement of dimethyl amine. In other cases, where a stable amino-amide of beta-cyano-acrylic acid can be isolated, such as $$CN-CH-CH-CONHCH_2CH_2NHCH_3$$

it can be reacted with a cyanuric chloride derivative, $Cl-C_3N_3(OR)_2$.

Various triazine monomers used hereinafter in the examples have the following formulas, in which $C_3N_3$ represents the trivalent symmetrical triazine nucleus:

Triazine monomer III–L
$$CN-CH-CHCONHCH_2CH_2NH-C_3N_3(OCH_3)_2$$

Triazine monomer IV–L
$$CN-CH-CHCONHCH_2CH_2NH-C_3N_3(OC_2H_5)_2$$

Triazine monomer VI–L
$$CN-CH-CHCONHCH_2CH_2NH-C_3N_3[OCH(CH_3)_2]_2$$

Triazine monomer VII–L
$$CN-CH-CHCONHCH_2CH_2NH-C_3N_3(OC_6H_5)_2$$

Triazine monomer VIII–L
$$CN-CH-CHCONH(CH_2)_6NH-C_3N_3(OCH_3)_2$$

Triazine monomer IX–L
$$CN-CH=CHCON-CH_2CH_2N-C_3N_3(OCH_3)_2$$
$$\qquad\qquad\qquad |\qquad\qquad |$$
$$\qquad\qquad\quad CH_3\qquad\;\; CH_3$$

Triazine monomer X–L
$$CN-CH-CHCONH(CH_2)_4-NH-$$
$$\qquad\qquad\qquad\qquad\qquad C_3N_3(OC_6H_4OCOCH_3)_2$$

Triazine monomer XI–L
$$CN-CH-CHCONHCH_2CH_2NH-$$
$$\qquad\qquad\qquad\qquad C_3N_3(OCH_2CH_2OCH_3)_2$$

Triazine monomer XII–L
$$\qquad\quad CH_3$$
$$\qquad\quad |$$
$$CN-CH=C-CONH-C_6H_{10}-NH-C_3N_3(OC_6H_4Cl_2)_2$$

Triazine monomer XIII–L $$CN-CH=CHC\underset{\underset{CH_2CH_2}{\diagdown}}{\overset{\overset{CH_2CH_2}{\diagup}}{O}N\quad N-C_2N_3-OC_6H_{11}}$$
$$\qquad\qquad\qquad\qquad OCH_3$$

Triazine monomer XIV–L
$$CN-CH-CHCON-C_6H_4-NH-C_3N_3(OCH_2C_6H_5)_2$$

Triazine monomer XV–L $$CN-CH=CHCONH-C\underset{\underset{CH_2CH_2}{\diagdown}}{\overset{\overset{CH_2CH_2}{\diagup}}{H}}N-C_3N_3(OCH_2CH_2OC_6H_5)_2$$

Triazine monomer XVI–L $$CN-CH=CHCONHCH_2CH-N-C_3N_3(OC_6H_4F)_2$$
$$\qquad\qquad\qquad\qquad\; |\quad |$$
$$\qquad\qquad\qquad\qquad C_6H_5$$
$$\qquad\qquad\qquad\qquad\; |$$
$$\qquad\qquad\qquad\qquad OCOCH_3$$

EXAMPLE I–m

*Preparation of Triazine Monomer*

Beta-cyano-acrylyl chloride (23.1 parts) in 50 parts of diethyl ether is added slowly and with stirring to a mixture of 40 parts of 2,4-dimethoxy-6-(beta-amino-ethoxy)-1,3,5-triazine and 150 parts of diethyl ether containing 37 parts of tributyl amine in a flask equipped for reflux. Upon completion of the addition of the acid chloride, the mixture is refluxed for approximately one-half hour and allowed to cool to room temperature, after which it is washed with water to remove the amine hydrochloride. The ether is then evaporated and the product again washed with water and recrystallized from acetone-water mixtures. There is obtained 2,4-dimethoxy-6-[beta-(beta-cyanoacrylamido)ethoxy]-1,3,5-triazine. Ultimate analyses for carbon, hydrogen, and nitrogen and molecular weight determination give values of 47.25%, 4.26%, 20.04% and 281.1, respectively, all of which values are in close agreement with the theoretical values.

Substitution of an equivalent quantity of beta-cyano-methacrylyl chloride for its homolog in the foregoing procedure, yields the corresponding triazine monomer. Ultimate analyses and molecular weight determination give 49.26% carbon, 5.15% hydrogen, 23.94% nitrogen and molecular weight of 291.4, all of which values agree closely with the theoretical values for 2,4-dimethoxy-6-[beta - (beta - cyano - methacrylamido) - ethoxy]-1,3,5-triazine. The corresponding chloracrylic derivative can be similarly prepared by use of beta-cyano-chloracrylyl chloride.

Various other triazine monomers of this invention can be prepared by the foregoing procedure using the appropriate cyano-acrylic and triazine intermediates. For example, the following monomers prepared accordingly are identified by the analyses and molecular weights indicated, all of which check closely with the theoretical values:

(a) 2,4 - diethoxy - 6 - [beta - (beta - cyano - acrylamido)-ethoxy]-1,3,5-triazine, with carbon, hydrogen, nitrogen and molecular weight values of 50.84%, 5.56%, 22.86% and 309.3, respectively;

(b) 2,4 - diethoxy - 6 - [6 - (beta - cyano - acrylamido)-n-hexoxy]-1,3,5-triazine, with carbon, hydrogen, nitrogen and molecular weight values of 56.22%, 6.88%, 19.31% and 361.7, respectively;

(c) 2,4 - diisopropoxy - 6 - [beta - (beta - cyano - chloracrylamido)-ethoxy]-1,3,5-triazine, with carbon, hydrogen, nitrogen, chlorine and molecular weight values of 48.72%, 5.46%, 19.07%, 9.67% and 369.5, respectively;

(d) 2,4 - di(cyclohexoxy) - 6 - [gamma - (beta - cyanomethacrylamido)-propoxy]-1,3,5-triazine, with carbon, hydrogen, nitrogen and molecular weight values of 62.36%, 7.47%, 15.86% and 440.9, respectively;

(e) 2,4 - bis - (beta-methoxy - ethoxy) - 6 - [beta - (N-methyl - beta - cyano - acrylamido) - ethoxy] - 1,3,5-triazine, with carbon, hydrogen, nitrogen and molecular weight values of 49.44%, 6.06%, 18.43% and 384.1, respectively.

Other methods of preparing the triazine monomers of this invention can be used. For example, the beta-cyano-acrylic acid anhydride, as well as the corresponding beta-cyano-alpha-methyl (beta-cyano-methacrylic) and beta-cyano-alpha-chloro (beta-cyano-chloracrylic) homologs can be used, according to well-known techniques for producing amides, with appropriate triazinyl amines to give desired triazine monomers. In certain cases, the triazine monomer can also be prepared by reacting an amide, such as N,N-dimethyl-beta-cyano-acrylamide, with a triazinyl ether-amine to give the corresponding triazine monomer by displacement of dimethyl amine. In other cases where a stable alcohol-amide of beta-cyano-acrylic acid can be isolated, such as CN—CH=CHCONHCH₂CH₂OH, it can be reacted with an appropriate cyanuric chloride derivative, Cl—C₃N₃(OR)₂.

Various triazine monomers used hereinafter in the examples have the following structural formulas, in which C₃N₃ represents the trivalent symmetrical triazine nucleus:

Triazine monomer III–M

Triazine monomer IV–M

Triazine monomer VI–M

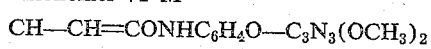

Triazine monomer VII–M

Triazine monomer VIII–M

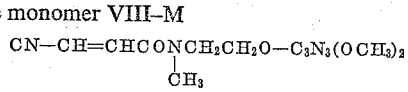

Triazine monomer IX–M

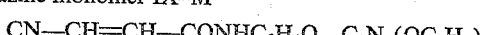

Triazine monomer X–M

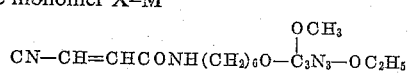

Triazine monomer XI–M

Triazine monomer XII–M

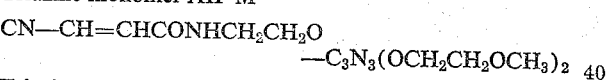

Triazine monomer XIII–M

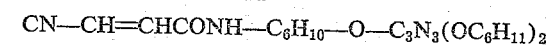

Triazine monomer XIV–M

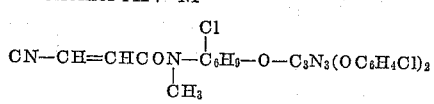

Triazine monomer XV–M

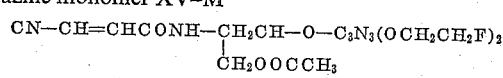

Triazine monomer XVI–M

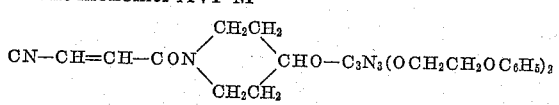

EXAMPLE I–n

*Preparation of Triazine Monomers*

(a) Maleic anhydride (9.8 parts) in 150 parts of benzene is added slowly and with stirring to a mixture of 20.1 parts of 2,4-dimethoxy-6-(beta-hydroxyethoxy)-1,3,5-triazine and 150 parts of diethyl ether. Upon completion of the addition of the anhydride, the mixture is refluxed for approximately one hour, after which it is allowed to cool to room temperature and is washed with water. The ether and benzene are then evaporated and the ester is recrystallized from acetone-water mixtures. There is obtained the maleic acid monoester of the above triazine compound. Ultimate analyses for carbon, hydrogen, and nitrogen, and molecular weight determination give values which are in close agreement with the theoretical values.

Substitution of equivalent quantities of the various other triazinyl alcohols described above for the one used in the foregoing procedure yields various monoesters of maleic acid of this invention. Corresponding fumaric, mesaconic, citraconic, chloromaleic, and chlorofumaric derivatives are prepared by using the corresponding acid anhydride according to the above procedure, or by using the corresponding acid chloride according to the procedure (b) given below. These are identified by ultimate analyses and molecular weight determinations as above. These monoacid esters can be used as such or can be converted to alkyl esters by reacting their sodium salts in the standard manner, with dialkyl sulfates, as for example with dimethyl or diethyl sulfate to produce the corresponding methyl, ethyl, or other alkyl esters. These esters may also be prepared as in the following procedure (b).

(b) The procedure of (a) is repeated using 14.85 parts of monomethyl fumaryl chloride in 150 parts of diethyl ether instead of the maleic anhydride solution and also using 18.5 parts of tributyl amine in the solution of the triazine. The monomethyl fumaric ester of 2,4-dimethoxy-6-(beta-hydroxyethoxy)-1,3,5-triazine is obtained which gives ultimate analyses and molecular weight values which check closely with the theoretical values. The fumaryl monochloride is similarly used to prepare the fumaric monoacid triazine monoester. The corresponding monomethyl maleic chloride is similarly used to prepare the corresponding mixed ester. Substitution of equivalent quantities of the various monoesters and of various triazinyl alcohols, as described above, for the monoester and triazinyl alcohol of the foregoing procedure, yields various corresponding esters of this invention. These are characterized by ultimate analyses and molecular weight determinations as above.

(c) The procedure of (b) is repeated using 7.65 parts of fumaryl dichloride instead of the 14.85 parts of monomethyl fumaryl chloride. The fumaryl diester of 2,4-dimethoxy-6-(beta-hydroxy-ethoxy)-1,3,5-triazine is obtained which gives ultimate analyses and molecular weight values which check closely with the theoretical values. Maleic dichloride and the dichlorides of the other acids indicated above are used similarly to produce the corresponding triazine diesters. When the various other triazinyl alcohols described above are substituted respectively in equivalent quantities in this foregoing procedure, the corresponding diesters are obtained.

(d) The procedure of (b) is repeated using 16.15 parts of mono(dimethylamido)-maleic chloride instead of the 14.85 parts of monomethyl fumaryl chloride. (This monoamide can be prepared by reacting, mole per mole, dimethylamine and maleic anhydride and subsequently converting the free acid group of the resulting mono-(dimethylamido) maleic monoacid to the acid chloride by the ordinary methods of converting acids to acyl chlorides, such as for example, by reacting with thionyl chloride.) There is obtained the mono-(dimethylamido) maleic ester of 2,4-dimethoxy-6-(beta-hydroxy-ethoxy)-1,3,5-triazine which gives ultimate analyses and molecular weight values which check closely with the theoretical values. The corresponding fumaryl monoamide monochloride is used similarly to produce the corresponding amide ester. Substitution of various other ethenedioic monoamides, and of various other triazinyl alcohols, as described above, for the monoamide and triazinyl alcohol of the foregoing procedure yields various amide ester triazine monomers of this invention.

Various other triazine monomers of this invention can be prepared by the foregoing procedures using the appropriate ethenedioic acid derivatives and the triazine intermediates. For example, the following monomers prepared accordingly are identified by the analyses and molecular weight determinations, all of which check closely with the theoretical values: morpholino monoamide of maleic monoester of 2,4-dimethoxy-6-(gamma-hydroxypropoxy)-1,3,5-triazine; piperidyl monoamide of fumaryl monoester of 2,4-dibutoxy-6-(gamma-hydroxybutoxy)-1,3,5-triazine; monobutyl alpha-chlormaleic monoester of 2,4-dipropoxy-6-(beta-hydroxyethylphenoxy)-1,3,5-triazine; piperazinyl monoamide of alpha-methylmaleic monoester of 2,4-dimethoxy-6-(beta-hydroxyethoxy)-1,3,5-triazine.

Various other methods can also be used for the preparation of the monomers. For example, appropriate compounds of the formulas

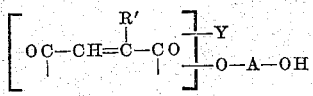

and

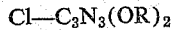

can be condensed in the presence of a hydrohalide acceptor such as sodium hydroxide under conditions known in the art for similar cyanuric chloride condensations, to produce desired triazine monomers.

As a further example of such other methods, such triazine monomers can also be prepared by using an appropriate triazine alcohol, as indicated above, to displace a low molecular weight alcohol from corresponding ethenedioic esters such as the methyl ester of maleic, fumaric, mesaconic, citraconic, chloromaleic, and chlorofumaric acids of ethylene glycol with an appropriate cyanuric chloride derivative, $Cl-C_3N_3(OR)_2$.

Various triazine monomers used hereinafter in the examples have the following structures wherein $C_3N_3$ represents the trivalent triazine nucleus:

Triazine monomer III-N

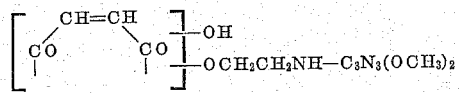

Triazine monomer IV-N

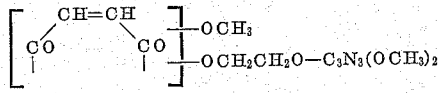

Triazine monomer VI-N

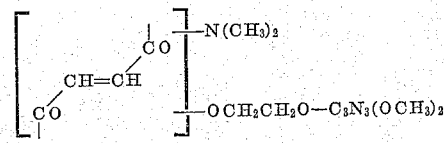

Triazine monomer VII-N

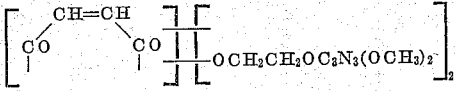

Triazine monomer VIII-N

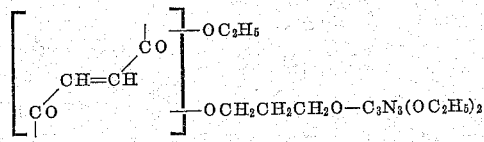

Triazine monomer IX-N

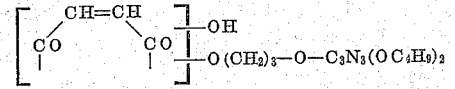

Triazine monomer X-N

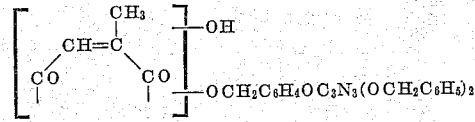

Triazine monomer XI-N

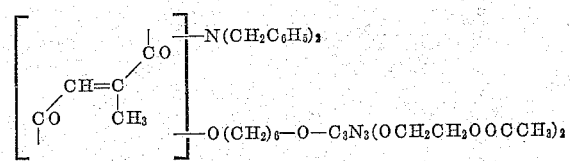

Triazine monomer XII-N

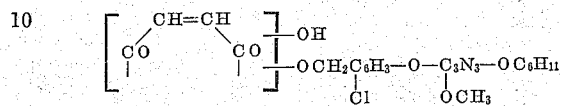

Triazine monomer XIII-N

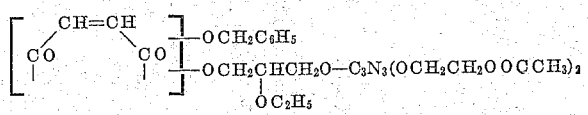

Triazine monomer XIV-N

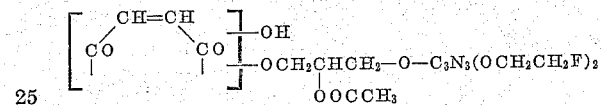

Triazine monomer XV-N

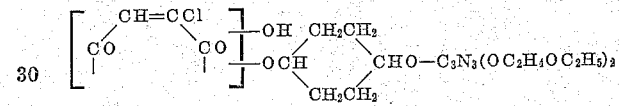

Triazine monomer XVI-N

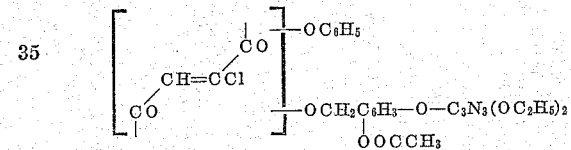

EXAMPLE I-o

*Preparation of Triazine Monomers*

(a) Maleic anhydride (9.8 parts) in 150 parts of benzene is added slowly and with stirring to a mixture of 19.9 parts of 2,4-dimethoxy-6-(beta-aminoethylamino)-1,3,5-triazine and 150 parts of diethyl ether. Upon completion of the addition of the anhydride, the mixture is refluxed for approximately one hour, after which it is allowed to cool to room temperature and is washed with water. The ether and benzene are then evaporated and the ester is recrystallized from acetone-water mixtures. There is obtained the maleic acid monoamide of the above triazine compound. Ultimate analyses for carbon, hydrogen, and nitrogen, and molecular weight determination give values which are in close agreement with the theoretical values.

Substitution of equivalent quantities of the various other triazinyl amines described above for the one used in the foregoing procedure yields various monoamides of maleic acid of this invention. Corresponding fumaric, mesaconic, citraconic, chloromaletic, and chlorofumaric derivatives are prepared by using the corresponding acid anhydride according to the above procedure, or by using the corresponding acid chloride according to the procedure (b) given below. These are identified by ultimate analyses and molecular weight determinations as above. These monoacid amides can be used as such or can be converted to amide-esters by reacting their sodium salts in the standard manner, with dialkyl sulfates, as for example with dimethyl or diethyl sulfate to produce the corresponding methyl, ethyl, or other alkyl esters. These amide-esters can also be prepared as in the following procedure (b).

(b) The procedure of (a) is repeated using 14.85 parts of monomethyl fumaryl chloride in 150 parts of diethyl ether instead of the maleic anhydride solution and also using 18.5 parts of tributylamine in the solution of the triazine. The methyl monoester of fumaric monoamide of 2,4 - dimethoxy - 6-(beta-aminoethylamino)-1,3,5-triazine is obtained which gives ultimate analyses and molecular weight values which check closely with the theoretical values. The fumaryl monochloride is similarly used to prepare the fumaric monoacid triazine monoamide. The corresponding monomethyl ester of maleic monochloride is similarly used to prepare the corresponding amide-ester. Substitution of equivalent quantities of the various ethenedioic monoester chlorides of various triazinyl amines, as described above, for the monoester chloride and triazinyl amine of the foregoing procedure, yields various corresponding amide-esters of this invention. These are characterized by ultimate analyses and molecular weight determinations as above.

(c) The procedure of (b) is repeated using 7.65 parts of fumaryl dichloride instead of the 14.85 parts of monomethyl fumaryl chloride. The fumaryl diamide of 2,4-dimethoxy-6-(beta-aminoethylamino)-1,3,5-triazine is obtained which gives ultimate analyses and molecular weight values which check closely with the theoretical values. Maleic dichloride and the dichlorides of the other acids indicated above are used similarly to produce the corresponding triazine diamides. When the various other triazinyl amines described above are substituted respectively in equivalent quantities in this foregoing procedure, the corresponding diamides are obtained.

(d) The procedure of (b) is repeated using 16.15 parts of mono(dimethylamido)-maleic chloride instead of the 14.85 parts of monomethyl maleic chloride. (This monoamide can be prepared by reacting, mole per mole, dimethylamine and maleic anhydride and subsequently converting the free acid group of the resulting mono-(dimethylamido) maleic monoacid to the acid chloride by the ordinary methods of converting acids to acyl chloride.) This is obtained the mono-(dimethylamido) maleic ester of 2,4-dimethoxy-6-(beta-aminoethylamino)-1,3,5-triazine which gives ultimate analyses and molecular weight values which check closely with the theoretical values. The corresponding fumaryl monoamide monochloride is used similarly to produce the corresponding mixed amide. Substitution of various other ethenedioic monochloride monoamides, and of various other triazinyl amines, as described above, for the monoamide chloride and triazinyl amine of the foregoing procedure yields various mixed amide triazine monomers of this invention.

Various other triazine monomers of this invention can be prepared by the foregoing procedures using the appropriate ethenedioic acid derivatives and triazine intermediates. For example, the following monomers prepared accordingly are identified by the analyses and molecular weight determinations, all of which check closely with the theoretical values; morpholino monoamide of maleic monoamide of 2,4-diethoxy-6-(gamma-aminopropylamino) - 1,3,5 - triazine; piperidyl monoamide of fumaryl monoamide of 2,4 - dibutoxy-6-(gamma-aminobutylamino)-1,3,5-triazine; monobutyl ester of alpha-chlormaleic monoamide of 2,4-dipropoxy-6-(beta-amino-ethylphenyl-amino)-1,3,5-triazine; piperazinyl monoamide of alpha-methylmaleic monoamide of 2,4 - diphenoxy - 6 - (beta-aminoethylamino)-1,3,5-triazine.

Various other methods can also be used for the preparation of the monomers. For example, appropriate compounds of the formulas

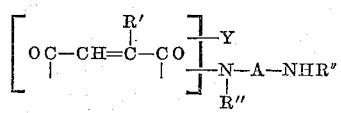

and

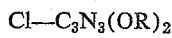

can be condensed in the presence of a hydrohalide acceptor such as sodium hydroxide under conditions known in the art for similar cyanuric chloride conditions, to produce desired triazine monomers.

Various triazine monomers used hereinafter in the examples have the following structures wherein $C_3N_3$ represents the symmetrical trivalent triazine nucleus:

Triazine Monomer III–O

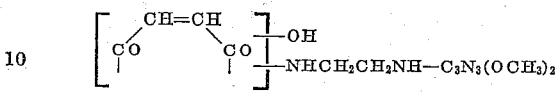

Triazine Monomer IV–O

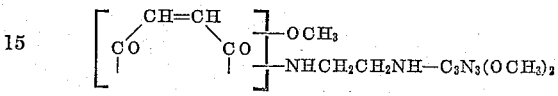

Triazine Monomer VI–O

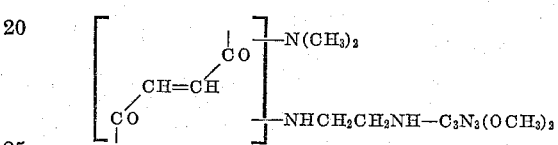

Triazine Monomer VII–O

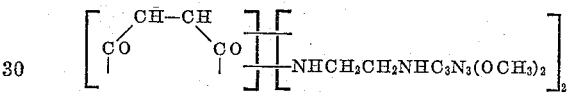

Triazine Monomer VIII–O

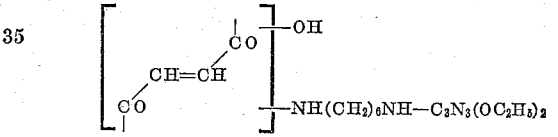

Triazine Monomer IX–O

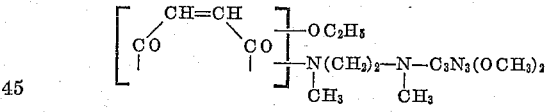

Triazine Monomer X–O

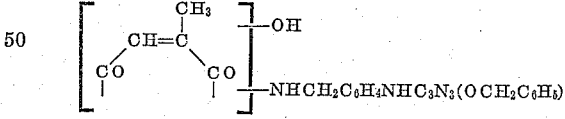

Triazine Monomer XI–O

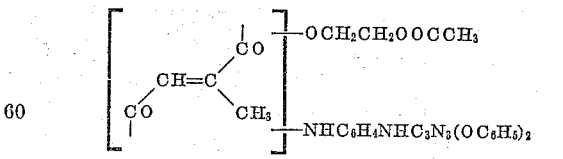

Triazine Monomer XII–O

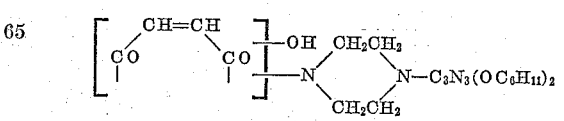

Triazine Monomer XIII–O

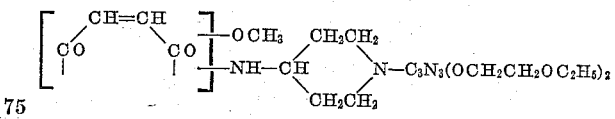

Triazine Monomer XIV-O

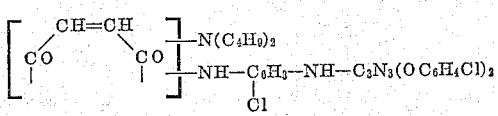

Triazine Monomer XV-O

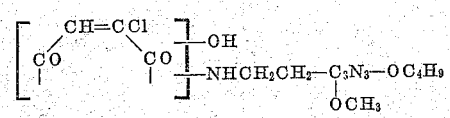

Triazine Monomer XVI-O

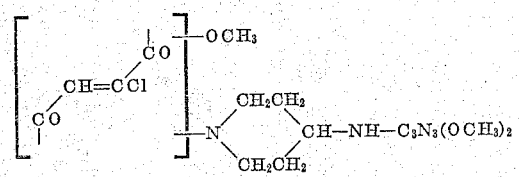

EXAMPLE I-p

Preparation of Triazine Monomers (a) Maleic anhydride (9.8 parts) in 150 parts of benzene is added slowly and with stirring to a mixture of 20 parts of 2,4 - dimethoxy-6-(beta-aminoethoxy)-1,3,5-triazine and 150 parts of diethyl ether. Upon completion of the addition of the anhydride, the mixture is refluxed for approximately one hour, after which it is allowed to cool to room temperature and is washed with water. The ether and benzene are then evaporated and the ester is recrystallized from acetone-water mixtures. There is obtained the maleic acid monoamide of the above triazine compound. Ultimate analyses and molecular weight determination give values which are in close agreement with the theoretical values.

Substitution of equivalent quantities of the various other triazinyl amines described above for the one used in the foregoing procedure yields various monoamides of maleic acid of this invention. Corresponding fumaric, mesaconic, citraconic, chloromaleic, and chlorofumaric derivatives are prepared by using the corresponding acid anhydride according to the above procedure, or by using the corresponding acid chloride according to the procedure (b) given below. These are identified by ultimate analyses and molecular weight determinations as above. These monoacid amides can be used as such or can be converted to amide-esters by reacting their sodium salts in the standard manner, with dialkyl sulfates, as for example with dimethyl or diethyl sulfate to produce the corresponding methyl, ethyl, or other alkyl esters. These amide-esters may also be prepared as in the following procedure (b).

(b) The procedure of (a) is repeated using 14.85 parts of monomethyl fumaryl chloride in 150 parts of diethyl ether instead of the maleic anhydride solution and also using 18.5 parts of tributyl amine in the solution of the triazine. The monomethyl ester of fumaric monoamide of 2,4-dimethoxy-6-(beta-amino-ethoxy)-1,3,5-triazine is obtained which gives ultimate analyses and molecular weight values which check closely with the theoretical values. The fumaryl monochloride is similarly used to prepare the fumaric monoacid triazine monoamide. The corresponding monomethyl maleic chloride is similarly used to prepare the corresponding amide-ester. Substitution of equivalent quantities of the various monoesters and of various triazinyl amines, as described above, for the monoester and triazinyl amine of the foregoing procedure, yields various corresponding amide-esters of this invention. These are characterized by ultimate analyses and molecular weight determinations as above.

(c) The procedure of (b) is repeated using 7.65 parts of fumaryl dichloride instead of the 14.85 parts of monomethyl fumaryl chloride. The fumaryl diamide of 2,4-dimethoxy - 6 - beta - (aminoethoxy)-1,3,5-triazine is obtained which gives ultimate analyses and molecular weight values which check closely with the theoretical values. Maleic dichloride and the dichlorides of the other ethenedioic acids indicated above are used similarly to produce the corresponding triazine diamides. When the various other triazinyl amines described above are substituted respectively in equivalent quantities in this foregoing procedure, the corresponding diamides are obtained.

(d) The procedure of (b) is repeated using 16.15 parts of mono(dimethylamido)-maleic chloride instead of the 14.85 parts of monomethyl maleic chloride. (This monoamide can be prepared by reacting, mole per mole, dimethylamine and maleic anhydride and subsequently converting the free acid group of the resulting mono-(dimethylamido) maleic monoacid to the acid chloride by the ordinary methods of converting acids to acyl chlorides, such as, for example, by reacting with thionyl chloride.) There is obtained the mono-(dimethylamido) maleic ester of 2,4 - dimethoxy-6-(beta-aminoethoxy) - 1,3,5-triazine, which gives ultimate analyses and molecular weight values which check closely with the theoretical values. The corresponding fumaryl monoamide monochloride is used similarly to produce the corresponding mixed amide. Substitution of various other ethenedioic monochloride monoamides, and of various other triazinyl amines, as described above, for the monoamide chloride and triazinyl amine of the foregoing procedure yields various mixed amide triazine monomers of this invention.

The various other triazine monomers of this invention can be prepared by the foregoing procedures using the appropriate ethenedioic acid derivatives and triazine intermediates. For example, the following monomers prepared accordingly are identified by the analyses and molecular weight determinations, all of which check closely with the theoretical values: morpholino monoamide of maleic monoamide of 2,4-dimethoxy-6-(gamma-aminopropoxy)-1,3,5-triazine; piperidyl monoamide of fumaryl monoamide of 2,4 - dibutoxy-6-(gamma - aminobutoxy)-1,3,5-triazine; monobutyl ester of alpha-chloromaleic monoamide of 2,4 - dipropoxy-6-(beta-amino - ethylphenoxy)-1,3,5-triazine; piperazinyl monoamide of alphamethylmaleic monoamide of 2,4-diphenoxy-6-(beta-aminoethoxy)-1,3,5-triazine.

Various other methods can also be used for the preparation of the monomers. For example, appropriate compounds of the formulas:

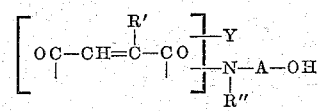

and

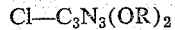

can be condensed in the presence of a hydrohalide acceptor, such as sodium hydroxide under conditions known in the art for similar cyanuric chloride condensations, to produce desired triazine monomers.

Various triazine monomers used hereinafter in the examples have the following structures wherein $C_3N_3$ represents the trivalent symmetrical triazine nucleus:

Triazine monomer III-P

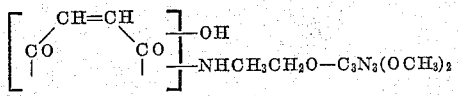

Triazine monomer IV-P

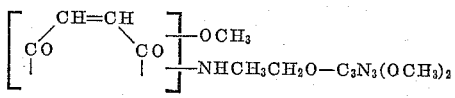

Triazine monomer VI-P

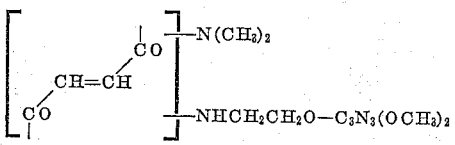

Triazine monomer VII-P

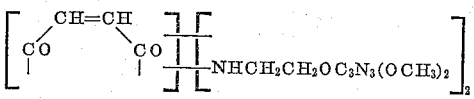

Triazine monomer VIII-P

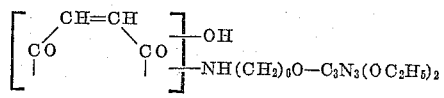

Triazine monomer IX-P

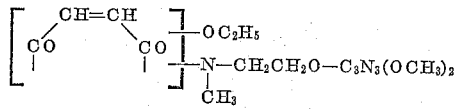

Triazine monomer X-P

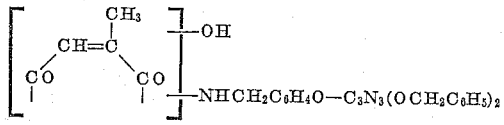

Triazine monomer XI-P

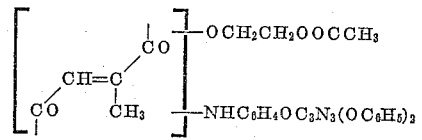

Triazine monomer XII-P

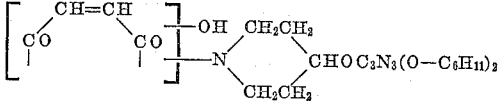

Triazine monomer XIII-P

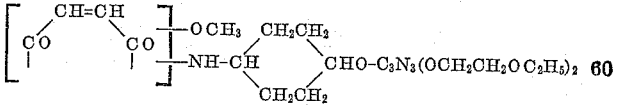

Triazine monomer XIV-P

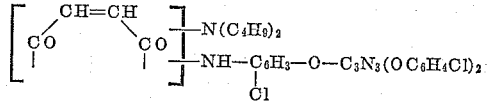

Triazine monomer XV-P

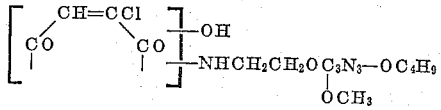

Triazine monomer XVI-P

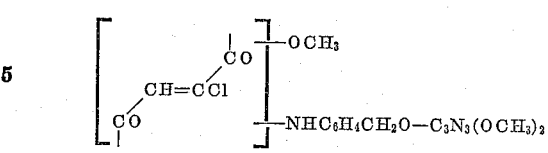

EXAMPLE II

*Homopolymerization of Triazine Monomer*

One hundred parts of any monomer prepared in Examples I—a—I—p is slowly added over a period of less than an hour to 1000 parts of distilled water at 30–50° C. containing dissolved therein one part of ammonium persulfate, one part of sodium bisulfite and 0.5 part of sodium dodecylbenzene sulfonate. The reaction is continued for six hours, at which time a yield of about 90 percent solid polymer is precipitated. The resulting polymer has a molecular weight over 10,000. Some of the polymer is dissolved in N,N-dimethyl acetamide and a film cast from the resultant solution. When this film is dyed according to the technique described in Example III hereof, the film shows a dense and deep shade of blue.

Other monomers of this invention are similarly polymerized.

The proportions of the triazine in the polymerization products of the invention may vary over a wide range, ranging from all or substantially all triazine down to very small amounts of triazine monomer such as may be employed in acrylonitrile polymers to impart dye susceptibility thereto. Although even smaller amounts are somewhat effective, the improvement in susceptibility of acrylonitrile copolymers to dyes becomes particularly noticeable when the triazine monomer content of the copolymer is about 0.1 percent and the susceptibility increases as the amount of triazine monomer is increased. Ordinarily sufficient improvement in dye susceptibility is obtained with amounts of the triazine monomer ranging up to about 10 or 15 percent but it may be advantageous for reasons such as in the preparation of ion-exchange polymers or as additives to improve dyeing properties to have a major proportion of triazine monomer in the acrylonitrile copolymer. In such cases, the concentration can range up to or approaching 100 percent. Within these proportions acrylonitrile copolymers of the invention show great affinity toward many dyes especially basic, acidic, vat and cellulose acetate dyes.

In addition to the improvements effected in the resulting copolymers, the use of the aforesaid triazinyl derivatives has certain other advantages over the use of the corresponding acids. For example, these triazinyl derivatives are more soluble in acrylonitrile than the acids. Thus it is generally easier to get complete copolymerization of the triazine monomer with acrylonitrile in solution, emulsion and suspension polymerizations.

The acrylonitrile copolymers discussed herein are soluble in N,N-dimethyl acetamide (DMA), N,N-dimethyl formamide (DMF), butyrolactone, ethylene carbonate and a number of similar solvents, used alone or in conjunction with N,N-dimethyl cyanamide, N,N-dimethyl cyanocacetamide, N,N - dimethyl methoxy - acetamide, methylene dinitrile, methylene di-thiocyanate, formyl caprolactam, formyl morpholine, tetra-methylene sulfone, etc. N,N-dimethyl methyl urethane of the formula $(CH_3)_2NCOOCH_3$, ethylene carbamate, N-methyl-2-pyrrolidone, etc. may also be used as solvents either by themselves or with the secondary solvents mentioned above. Nitroalkanes, such as nitro-methane, may be used as solvents for such copolymers having no more than about 85 percent acrylonitrile, providing the comonomers used in preparing such copolymers do not have substituent groups of equal or greater secondary bonding force than the cyano groups in acrylonitrile. Copolymers of the present invention which have high proportions of monomers of relatively low secondary-valence bonding strength such as vinyl chloride, may often be dissolved in acetone or mixtures of acetone or acetone with water and solvents of the above types.

EXAMPLE III

Five polymers of acryonitrile are prepared in each case from the following monomer compositions containing individually as the triazine monomer those identified above as triazine monomer III–A, III–B, III–C, III–D, III–E, III–F, III–G, III–H, III–I, III–J, III–K, III–L, III–M, III–N, III–O, and III–P respectively.

| Polymer | Acrylonitrile, parts | Triazine monomer, parts |
|---|---|---|
| A | 100 | 0.0 |
| B | 99.9 | 0.1 |
| C | 95 | 5.0 |
| D | 90 | 10.0 |
| E | 80 | 20.0 |

The 100 parts of monomer or monomer mixture is, in each case, slowly added over a period of less than an hour to 1000 parts of distilled water at 30–50° C. containing dissolved therein one part of ammonium persulfate, one part of sodium bisulfite and 0.5 part of sodium dodecylbenzene sulfonate. The reaction is continued for 6 hours, at which time a yield of about 90 percent solid polymer is precipitated. The resulting polymers have molecular weights over 10,000. Each polymer is dissolved in N,N-dimethyl acetamide and a film cast from each solution.

A water solution of methylene blue dye (a basic dye) is prepared by making a paste of the dye and then diluting to a 1 percent by weight dye solution. This type solution is kept boiling for one hour while the aforementioned films are immersed therein for one hour. The dyed films are then removed and separately subjected to washing with boiling water for one hour the boiling water being changed frequently to remove the desorbed dye. The unmodified polyacrylonitrile film shows only a light tint, whereas the copolymers are a dense and deep shade. Identical films, cold-drawn and heat-treated, show dyeing characteristics similar to the undrawn films.

Fibers are spun from the same N,N-dimethyl acetamide solutions either by dry spinning or by wet spinning, into glycerine baths. The fibers are substantially freed from solvent and dried. After cold-drawing the dried fibers 600–900 percent at 120–145° C. and subsequently heat-treating them at 150° C. for one hour, the fibers are given the same dyeing and washing treatment described above with the same results as for the films, a light tint being acquired by the unmodified polyacrylonitrile fibers and a deep and dense color being given to the copolymer fibers.

Instead of the specific triazine monomers used in this example, the various other related triazine monomers as disclosed above, can be used with similar results.

EXAMPLE IV

Five polymers of acrylonitrile are prepared in each case from the following monomer compositions using individually as the triazine monomer those identified above as triazine monomer IV–A, IV–B, IV–C, IV–D, IV–E, IV–F, IV–G, IV–H, IV–I, IV–J, IV–K, IV–L, IV–M, IV–N, IV–O, and IV–P respectively.

| Polymer | Acrylonitrile, parts | Triazine monomer, parts |
|---|---|---|
| A | 100 | 0.0 |
| B | 99.9 | 0.1 |
| C | 95 | 5.0 |
| D | 90 | 10.0 |
| E | 80 | 20.0 |

To 900 parts of water, adjusted to a pH of about three in a suitable reactor, is added 1 part sodium dodecyl benzene sulfonate, 1.0 part of ammonium persulfate, 0.5 part of sodium bisulfite, and 100 parts of monomer or monomer mixture.

The reactor is then flushed with deoxygenated nitrogen and heated with agitation to 50° C. for 24 hours. Steam is introduced into the reactor to remove unpolymerized monomers from the mixture. A small amount of aluminum sulfate is added to the mixture and the polymer in each case is isolated by filtration.

The polymer is then washed with water and with methyl alcohol. A portion of the polymer is dissolved in ethylene carbonate and a film cast from the solution. The film is washed entirely free of solvent and stretched at a ratio of about 8:1 in a glycerine bath at 135–145° C. The film is then washed with water and dyed in a bath containing 0.05 part of 1,5-diamino-4,8-dihydroxyanthraquinone-3-sulfonic acid, 0.03 part sulfuric acid and 50 parts water (50:1 bath-film ratio) at boiling temperature for one hour. The film is then removed and washed with water and scoured for 15 minutes in a 0.4 percent soap solution at 85° C. Whereas the unmodified polyacrylonitrile has little or no color, all of the copolymers are dyed a deep blue shade.

Fibers are spun from the same solutions either by dry spinning or by wet spinning. The fibers are substantially free from solvent and dried. After cold-drawing the dried fibers 600–900 percent at 120–145° C. for one hour, the fibers are given the same dyeing and washing treatment described above with the same results as for the films, a light tint being acquired by the unmodified polyacrylonitrile fibers and a deep and dense color being given to the copolymer fibers. The polymers of this example are also soluble in dimethyl formamide, dimethyl acetamide, dimethyl sulfone, butyrolactone, formyl morpholine, etc.

Instead of the monomers of the preceding example, the various other triazine monomers can be used as embraced by the formula given above, such as, for example, those identified above as triazine monomers X–A—XVI–P inclusive.

EXAMPLE V

Five parts of each of the copolymers fibers D of Examples III–A, III–B, III–C, III–D, III–E, III–F, III–G, III–H, III–I, III–J, III–K, III–L, III–M, III–N, III–O, and III–P respectively, are dyed to a green shade using the vat color dimethoxy-dibenzanthrone at 700° C. in a bath containing 0.5 part of dye, 0.25 part sodium hydroxide, 0.5 part sodium hydrosulfite, and 100 parts of water (20:1 bath-fiber ratio). After the first 15 minutes of heating, 0.25 part of Glauber's salt is added. The sample fibers are then oxidized in a 0.5 percent sodium dichromate-1.0 percent acetic acid aqueous solution at 70° C. for 30 minutes in a 20:1 bath-fiber ratio. The dyed fibers are scoured in a 0.5 percent boiling soap solution. A sample of yarn prepared from the unmodified polyacrylonitrile and dyed under the same conditions results in a light shade of color.

When 1,5-di-p-anisoylamino-4,8-dihydroxy-anthraquinone is used as the vat dye, the fiber is dyed a strong violet color.

EXAMPLE VI

The procedure of Example III is repeated in each case for the polymerization of the following monomer compositions using individually as the triazine monomer, those identified above as triazine monomers VI–A, VI–B, VI-C, VI-D, VI-E, VI-F, VI-G, VI-H, VI-I, VI-J, VI-K, VI-L, VI-M, VI-N, VI-O, and VI-P respectively:

| Polymer | Acrylonitrile, Parts | Vinyl Chloride, Parts | Triazine Monomer, Parts | Copolymer Soluble in— |
|---|---|---|---|---|
| A | 92 | 5 | 3 | DMF, DMA, etc. |
| B | 87 | 10 | 3 | DMF, DMA, etc. |
| C | 82 | 15 | 3 | DMF, DMA, etc. |
| D | 77 | 20 | 3 | NO₂Me. |
| E | 57 | 40 | 3 | NO₂Me. |
| F | 37 | 60 | 3 | Acetone. |

Sometimes copolymers D and E, when dissolved in nitromethane (NO₂Me) may have gelled, partially dissolved particles known as fisheyes. In such cases, the solubility may be improved by the addition of small amounts of materials which are good solvents for acrylonitrile polymers, such as butyrolactone, dimethyl formamide, dimethyl acetamide, dimethylsulfone, etc. In addition, certain materials which are relatively poor solvents for polyacrylonitrile, such as diethyl formamide, diethyl acetamide, diethyl propionamide, etc., may be added to improve the solubility. Also, when acetone solutions of copolymer F contain gelled particles, clarification of the solution may be effected by the addition of nitromethane, diethyl formamide, diethyl acetamide, etc.

Dyeing tests of these copolymers show improvements in dyeing susceptibility similar to those of Example III.

Instead of this specific triazine monomer, other triazine monomers, such as identified above as triazine monomers X-A—XVI-T inclusive, can be used with similar results.

EXAMPLE VII

The procedure of Example III is repeated in each case for the polymerization of the following monomer compositions containing individually as the triazine monomers those identified above as triazine monomers VII-A, VII-B, VII-C, VII-D, VII-E, VII-F, VII-G, VII-H, VII-I, VII-J, VII-K, VII-L, VII-M, VII-N, VII-O, and VII-P respectively:

| Polymer | Acrylonitrile, Parts | Styrene, Parts | Triazine Monomer, Parts |
|---|---|---|---|
| A | 88.0 | 7 | 5.0 |
| B | 78.0 | 17 | 5.0 |
| C | 68.0 | 27 | 5.0 |
| D | 58.0 | 37 | 5.0 |

Dyeing tests of these copolymers show improvements in dye susceptibility similar to Example III. In place of styrene, various styrene derivatives may be used, such as alpha-methyl styrene; nuclear substituted chloro styrenes, i.e., ortho-, meta-, and para-chloro styrenes, dichloro-styrenes, for example, the 2,3-, 2,4-, 2,5-, 2,6-, 3,4- and 3,5-dichloro-styrenes, trichloro styrenes; cyano-styrenes, such as ortho-, meta-, and para-cyano-styrenes, dicyano-styrenes; nuclear-substituted alkyl-styrenes, such as mono- and dimethyl-styrenes, mono- and di-ethyl-styrenes, mono- and di-isopropyl styrenes; aryl-substituted styrenes, i.e., para-phenyl-styrene, etc., cycloaliphatic substituted styrenes, such as para-cyclohexyl-styrene; fluoro-styrenes, such as ortho-, meta-, para-fluoro-styrene, difluoro-styrenes, etc.; trifluoromethyl-styrenes, such as ortho-, meta-, and para-trifluoromethyl-styrenes, di-(trifluoromethyl)-styrenes, and various other styrenes or mixtures of any number of these with each other or with styrene.

Instead of this specific triazine monomer, various other triazine monomers, such as those identified above as triazine monomers X-A—XVI-T inclusive, can be used with similar results.

EXAMPLE VIII

The procedure of Example III is repeated in each case for the polymerization of the following monomer compositions containing individually as the triazine monomers those identified above as triazine monomers VIII-A, VIII-B, VIII-C, VIII-D, VIII-E, VIII-F, VIII-G, VIII-H, VIII-I, VIII-J, VIII-K, VIII-L, VIII-M, VIII-N, VIII-O, and VIII-P respectively:

| Polymer | Acrylonitrile, Parts | Vinylidene Chloride, Parts | Triazine Monomer, Parts | Copolymer Soluble in— |
|---|---|---|---|---|
| A | 85 | 5 | 10 | DMF, DMA, etc. |
| B | 65 | 25 | 10 | DMF, DMA, etc. |
| C | 45 | 45 | 10 | DMF, DMA, etc. |
| D | 25 | 65 | 10 | DMF, DMA, etc. |
| E | 5 | 85 | 10 | DMF, DMA, etc. |

With the above vinylidene chloride copolymers and similar copolymers having a total of acrylonitrile and divinylidene chloride of at least 85 percent in the polymer molecules, only the more active solvents, such as butyrolactone, N,N-dimethyl acetamide, N,N-dimethyl formamide, etc., can be used as solvents. The above copolymers dye more readily and thoroughly than similar copolymers containing no triazine monomer groups.

In addition to copolymerization such as described above, it is also advantageous to polymerize the triazine monomers in the presence of preformed polymers and copolymers, for example polymers and copolymers of acrylonitrile. It is particularly advantageous, and excellent results are obtained, when one or more triazine monomers is added to a polymerization system in which acrylonitrile, for example, has just been homo- or copolymerized and in which the catalyst has not yet been deactivated and the polymer not yet separated therefrom, and polymerization is continued so as to polymerize or copolymerize the triazine monomers with the still-active polymer of acryonitrile, etc. Good results are also obtained even when the prepolymer has been separated from the polymerization system and is resuspended in a polymerization system in which the triazine monomer subsequently is polymerized in its presence. The proportions and other conditions in both cases are similar to those used in various examples shown herein. For example, excellent results are obtained when Examples III, IV, VI, VII and VIII are repeated except that the triazine monomer is withheld and is added one hour before the end of the polymerization period. Excellent dyeing results in each case when tested according to Example V.

EXAMPLE IX

The procedure of Example III is repeated in each case for the polymerization of the following monomer compositions containing individually as the triazine monomers those identified above as triazine monomers IX-A, IX-B, IX-C, IX-D, IX-E, IX-F, IX-G, IX-H, IX-I, IX-J, IX-K, IX-L, IX-M, IX-N, IX-O, and IX-P respectively:

| Polymer | Acrylonitrile, Parts | Vinylidene Chloride, Parts | Vinyl Chloride, Parts | Triazine Monomer, Parts |
|---|---|---|---|---|
| A | 50 | 10 | 8 | 2 |
| B | 70 | 20 | 8 | 2 |
| C | 70 | 15 | 13 | 2 |
| D | 50 | 20 | 28 | 2 |
| E | 20 | 18 | 60 | 2 |

The dyeing tests of the copolymer products show dye susceptibility similar to the copolymers of Example III.

Instead of this specific triazine monomer various other triazine monomers, such as identified above as triazine monomers X-A, XVI-T inclusive, can be used with similar results.

Instead of copolymerizing the above esters with the acrylonitrile, the esters may be polymerized independently as shown in Example II to produce homopolymers and the prepared polymer used to modify polyacrylonitrile or other acrylonitrile copolymers. The acrylonitrile polymers may be blended with up to 10 percent or more of the modifying polymers without serious loss in the physical or chemical properties of the resulting dyed structures, or may be added to acrylonitrile monomer and the mixture polymerized. The following example is illustrative.

EXAMPLE X

A 10 percent solution in dimethyl formamide is prepared from each of the polymers made in Example II and is added to an individual dimethyl formamide solution of polyacrylonitrile, containing 20 percent polymer so that a composition consisting of 90 parts of polyacrylonitrile and 10 parts of each of the above polymers is obtained. The solution is heated to 130° C. after which the solution is filtered. Films and fibers prepared from this mixture are dyed in accordance with the process of Example III and satisfactory dyed, shaped articles are obtained. The unmodified polyacrylonitrile without the addition of the homopolymer show little or no dye retention.

Instead of using the homopolymers of this example, copolymers of the triazine monomers, including those with other monomers, such as polymers D and E of Example IV, may be used as modifiers for the homopolymers or copolymers of acrylonitrile. For example, each of the polymers E of Example IV, which consist of 80 parts of acrylonitrile and 20 parts of a triazine monomer, has excellent compatibility with polymers of acrylonitrile and has little or no detrimental effect on the physical properties of oriented fibers and films. In many cases, it is desirable to use as modifiers copolymers which have even a higher ratio of the triazine monomer, as for example, 50 to 70 parts of the triazine monomer copolymerized with acrylonitrile or methacrylonitrile. In other cases, the copolymers of the triazine monomer with other monomers are satisfactory, such as, for example, copolymers of styrene, vinyl chloride, vinylidene chloride, alpha-methyl-styrene, vinylidene cyanide, etc.

When it is desired to modify an acrylonitrile copolymer, such as the copolymer of acrylonitrile and styrene or the copolymers of acrylonitrile and other copolymerizable ethylenic compounds, it is usually desirable to use as modifiers copolymers containing the same structural units as are present in the acrylonitrile copolymer. Thus, as there are present in the acrylonitrile copolymer structural units derived from the acrylonitrile and styrene, it is desirable to have present in the modifying copolymer structural units derived from styrene in addition to those derived from acrylonitrile and the triazine monomer. By thus including in the modifying copolymers structural units of the same type as the structural units of the copolymer to be modified, greater compatibility between the acrylonitrile copolymer to be modified and the modifying copolymer is obtained and the two are more readily soluble in the mutual solvent and will more readily mix into homogeneous polymer mixtures.

The polymerization products of the triazine monomers of the present invention have in the polymer molecule a plurality of repeating units of the formula given above and will contain additional repeating units of the formula

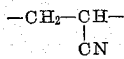

when the triazine monomer is copolymerized with acrylonitrile.

In addition, the copolymers may contain any number of repeating units of the type obtained by the copolymerization of the triazine monomer or a mixture of acrylonitrile and the triazine monomer with one or more copolymerizable ethylenic compounds, such as, for example, vinylidene chloride, vinyl chloride, styrene, alpha-methyl-styrene, methacrylonitrile, fumaro-nitrile, beta-cyanoacrylamide, and methyl-beta-cyano-acrylate, etc.

As previously indicated, the solvent resistance of such copolymers as contain one or more monomer units in addition to those formed by the acrylonitrile and the triazine monomer is affected by the type and proportion of copolymerizing monomer or monomers used to replace part of the acrylonitrile. For example, copolymers containing small amounts of the triazine monomer units may contain various proportions of such monomer units as obtained from vinylidene chloride, methocrylonitrile, fumaro-nitrile, and beta-cyano-acrylamide without considerable reduction in solvent resistance. Replacement of acrylonitrile units in the copolymers by vinyl chloride, styrene and alpha-methyl-styrene units result in copolymers of lowered solvent resistance, the amount of such lowering in resistance in each case depending on the amount substituted. In addition to the solvent resistance, certain other physical properties of the copolymers are affected by the presence in these additional units in the copolymers. The amount and character of the changes in physical properties of these copolymers depend again on the type and proportion of copolymerizing monomer or monomers used. For example the tensile strength of an acrylonitrile triazine monomer type copolymer will decrease much more when a monomer having relatively weak secondary bonding forces, such as styrene or ethylene is used to replace part of the acrylonitrile than when a monomer having relatively strong bonding forces, such as methacrylonitrile, fumaronitrile, beta-cyano-acrylamide, methyl beta-cyano-acrylate and vinylidene chloride, is used to replace part of the acrylonitrile. Moreover, the ability of these copolymers to form molecularly oriented shaped articles depends on the type and amount of the copolymerizing monomer or monomers used to replace acrylonitrile.

Other copolymerizable ethylenic compounds, which may also be present in the polymerizable masses for copolymerization with the esters used in the practice of this invention include one or more of the following: acrylates, e.g. methyl acrylate; methacrylates, e.g. methyl methacrylate; acrylamides; methacrylamides; vinyl esters, such as vinyl acetate; maleates, such as dimethyl and diethyl maleates; fumarates, such as dimethyl and diethyl fumarates; itaconic diesters, such as dimethyl and diethyl itaconates; itaconamide; vinyl halides, such as vinyl fluoride, vinylidene cyanide, vinylidene fluoride, tetrafluoroethylene, trifluorochloroethylene; vinyl aryls, such as vinyl naphthalenes and substituted styrenes as listed in Example VII, etc.

The polymerization products of this invention may be prepared by various polymerization systems, such as emulsion, suspension, mass and solution polymerizations. In addition to the monomers, the polymerizable mass may also contain other materials such as catalysts, e.g. peroxides, such as benzoyl peroxide, naphthyl peroxides, phthalyl peroxide, tertiary-butyl hydroperoxide, hydrogen peroxide, cyclohexyl hydroperoxide, tertiary-butyl perbenzoate, etc., azo-catalysts, persulfates, such as ammonium persulfate, etc., solvents, suspension or emulsion media, emulsifying agents, suspension agents, plasticizers, lubricants, etc.

For use in the preparation of shaped articles, the polymerization products of this invention have molecular weights preferably of at least about 10,000. However, polymerization products of molecular weights less than 10,000 may be used for other purposes, such as impregnants, solvent resistant coatings, etc. The molecular weight of the polymerization products is dependent on the concentrations of the monomers, the amount and type of catalyst, the temperature of reaction, etc.

As is quite generally known in the field of high polymers, molecular orientation is usually indicated and identified by birefringence of polarized light, as under Nicol prisms, by increased density as compared to the density of the same polymer unoriented, and by characteristic X-ray diffraction patterns. When a material is crystalline or oriented, its X-ray diagram shows bright areas or spots for points of crystallization and dark areas for the non-crystalline regions. The intensity or number of these bright spots increases with the degree of orientation or crystallization. Amorphous or non-crystalline materials give X-ray diagrams having very few high lights or bright spots whereas crystalline or oriented materials give definite X-ray diffraction patterns. In these patterns there are definite relationships of the bright spots with regard to position and spacing which are generally characteristic of the composition of the material being X-rayed. In fibers or films the orientation usually follows the direction of drawing or stretching so that the orientation is parallel to the fiber axis or a major surface.

Useful fibers can be made from the solutions of the copolymers of this invention by dry spinning, as in the preparation of cellulose acetate fibers, or by wet spinning, as in the preparation of viscose rayon. In wet spinning, the solution of copolymer can be spun into a substance which is non-solvent for the copolymer, but which is advantageously compatible with the solvent in which the copolymer is dissolved. For example, water, acetone, methyl alcohol, carbon disulfide, glycerine, chloroform, carbon tetrachloride, benzene, etc. can be used as a precipitating bath for N, N-dimethyl acetamide, dimethyl sulfone, butyrolactone and other solvent compositions of these copolymers. The extruded fibers, from which substantially all of the solvent has been removed in the spinning step, about 1–10 percent remaining in the shaped articles, can then be cold-drawn about 100–900 percent, preferably about 300–600 percent; and the drawn fiber heat-treated, usually at substantially constant length, at about 100–160° C. to effect further crystallization and the removal of the remaining solvent. The term "heat-treated," as used herein, refers to the application of heat to an object, usually at a controlled temperature and usually by means of the medium surrounding the object.

Many of the acrylonitrile copolymers of this invention can be molecularly oriented, especially if there is no more than 15 percent triazine monomer in the polymer molecule. This is true when the major portion of the copolymer is acrylonitrile, for example, 85 percent or more acrylonitrile, or when the other copolymerizing monomers used in making such copolymers have substituent groups having secondary-valence bonding forces equal to or greater than exhibited by the cyano group in acrylonitrile. For example, if such monomers as methacrylonitrile, fumaronitrile, vinylidene chloride, beta-cyano-acrylamide and methyl beta-cyano-acrylate are used with acrylonitrile and the triazine monomer, the proportion of acrylonitrile in the copolymers can be much less than 85 percent without destroying the capacity for molecular orientation. Molecularly oriented, cold-drawn, shaped articles of particular usefulness are prepared from copolymer compositions containing the polymer molecules 60–99.9 percent acrylonitrile, 0.1–15 percent, advantageously 0.1–5 percent, triazine monomer, with or without one or more monomers of the class consisting of vinylidene chloride, vinylidene cyanide, vinyl chloride, styrene, alpha-methyl-styrene, methacrylonitrile, fumaronitrile, beta-cyanoacrylamide and methyl beta-cyano-acrylate, the effects of the presence of the monomers of this class being noticeable when the monomer is present in the polymer molecule in amounts of 1 percent or more.

For example, cold-drawn fibers of excellent properties are prepared from copolymers containing about 60–98.9 percent acrylonitrile, about 0.1–5 percent triazine monomer and about 1–39.9 percent or one or more compounds selected from the class consisting of vinyl chloride vinylidene chloride, styrene, alpha-methyl-styrene, methacrylonitrile, fumaronitrile, beta-cyano-acrylamide and methyl beta-cyano-acrylate.

The copolymerization products of this invention show great affinity for the acetate, basic, acidic, and vat dyes. The cellulose acetate dyes which are effective with these polymerization products are mainly amino-anthra-quinone derivatives. The basic dyestuffs toward which these polymerization products show great affinity are preferably those which contain amide, alkyl-amido, or ammonium groups, such as $-NH_2-N(CH_3)_2$, $-N(C_2H_5)_2$, $-NHC_6H_5$, $-N(CH_3)_3OH$, etc. and which may also be used in the form of their salts, i.e., the hydrochlorides, sulfates or oxalates. Some of these basic dyes are Methylene Blue, Rhodamine B, Indamine Blue, Auramine, Meldola's Blue, Chrysoidine Y, Acridine Yellow, Magenta, Crystal Violet, Thioflavine T, Saffranine and Bismarck Brown. The cellulose acetate dyes which are effective with these polymerization products are mainly amino-anthraquinone derivatives, basic azo compounds and other basic substances, such as the Duranol, Dispersol, Sericol, etc. dyestuffs.

The basic dyes listed above by their common names, namely Methylene Blue, etc., are identified in the literature. Lubs monograph on "The Chemistry of Synthetic Dyes and Pigments", published by Reinhold Publishing Company in 1955, shows the formula for Methylene Blue on page 266, for Rhodamine B, on page 296, Auramine on page 245, Acridine Yellow on page 232, Crystal Violet on page 229, Saffranine on page 238, and Bismarck Brown on page 114. Whitmore's "Organic Chemistry", published in 1937 by D. D. Van Nostrand Co. shows the formula for Meldola's Blue on page 920, and for Magenta on page 847. The third edition of "An Outline of Organic Chemistry" by Degering et al, published in 1939 by Barnes and Nobles, Inc., shows the formula for Indamine Blue on page 252. The Rawson and Laycock "Dictionary of Dyes, Mordants, etc.," published in 1901 by Charles Griffin and Company, Ltd. (London), shows Chrysoidine Y on page 90. The "Condensed Chemical Dictionary" published by Reinhold Publishing Corp. in 1956, shows Thioflavine T on page 1088. A number of other acidic dyes that can be used are anthranilic acid→1-(4' sulfophenyl), 3-methyl-5-pyrazolone, 1,5- diamino-4,8-dihydroxyanthraquinone - 3 - sulfonic acid; 1-aminonaphthalene - 4-sulfonic acid→alphanaphthol-4-sulfonic acid; the sodium salt of sulfanilic acid→aniline→2-benzoyl-amino-5-naphthol-7-sulfonic acid; the sodium salt of 4, 4'-diaminostilbene 2,2'-disulfonic acid⇌(phenol)₂ ethylated; 1,5 - diamino - 4,8-dihydroxyanthraquinone-3-sulfonic acid; dye prepared by diazotizing 1-aminonaphthalene-4-sulfonic acid and coupled with alpha-naphthal-4-sulfonic acid; the sodium salt of (m-aminobenzoic acid→o-anisidine) phosgenated; the sodium salt of 2-naphthol-6,8-disulfonic acid←benzidine→phenol; ethylated dimethoxy-dibenzanthrone; and 1,5-di-p-anisoylamino-4,8-dihydroxyanthraquinone.

From the molecularly orientable copolymers of this invention fibers can be prepared having improved dyeing properties, low shrinkage in boiling water, sometimes as low as 3 to 5 percent or less of the cold-drawn or stretched article, good heat resistance, and tensile strength in order of 4 to 6 grams per denier. Moreover, these properties make the fibers desirable in the manufacture of hosiery and for such all-purpose fabrics as used for blouses, shirts, suits, etc.

The following triazine intermediates can be used in the preparation of the above triazine monomers, the various symbols representing groups as defined above:

(1) $HO-A-NR''-C_3N_3(OR)_2$
(2) $HO-A-O-C_3N_3(OR)_2$
(3) $R''HN-A-NR''-C_3N_3(OR)_2$
(4) $R''HN-A-O-C_3N_3(OR)_2$

In general these are prepared by the reaction of the appropriate glycol, diamine compound, hydroxy amine compound, hydroxy nitro or cyano compound (with subsequent reduction), etc., with the appropriate $Cl-C_3N_3(OR)_2$ or with cyanuric chloride to replace only one chlorine and subsequently replacing the remaining two chlorine atoms with the desired OR groups on the triazine nucleus.

Obviously, the proportions and conditions of reaction will be used to favor the type of derivative desired. For example, in preparing compounds of the second and third formulas given above, an excess over the stoichiometric amount of the appropriate glycol or diamino compound generally will be used to repress di-substitution on the glycol or diamine. Then the excess glycol or diamine can be separated by crystallization, extraction, distillation, or other appropriate means depending on the particular compounds being used.

Moreover, in preparing compounds of the first and fourth of the above formulas, the reagents and conditions will be selected to favor the attachment of the appropriate group to the triazine nucleus, or reagents will be selected which favor the particular type of attachment desired. For example, the preparation of compounds of the first of the above formulas is favored by the direct reaction of an amino hydroxy compound with a $$Cl-C_3N_3(OR)_2$$

compound in the presence of alkali. When it is desired to have the attachment take place through the oxygen of the hydroxy group to give intermediates of the fourth of the above formulas, conditions favoring that reaction can be used, such as using a nitro alkanol compound and subsequently reducing the nitro group. In certain cases, it may be desirable to avoid the preparation of intermediates of the fourth formula above by taking advantage of the greater reactivity of the amino group of the appropriate amino-hydroxy compound and to react it first with the unsaturated acid, such as acrylic, cyanoacrylic, maleic, itaconic, etc., to give the appropriate amide having an unreacted hydroxy group which can be reacted with the appropriate triazine compound, e.g., $Cl-C_3N_3(OR)_2$, to give the desired monomer.

The OR groups can be present in the starting compounds since these groups will not interfere with the reaction in which the —A—NR″— or —A—O— radicals are attached to the triazine nucleus. The OR groups on the triazine ring are not very reactive even when R is hydrogen and do not interfere with the various preparations.

In some cases it may be desirable to have these two positions occupied by chlorine during the reaction which effects the attachment of the A-containing group to the triazine nucleus. The two remaining chlorine groups on the triazine nucleus can be replaced subsequently by the desired OR groups according to known procedures for such replacement.

These preparations are illustrated by the following examples in which parts and percentages, unless otherwise indicated, are parts by weight and percentages by weight. The $Cl-C_3N_3(OR)_2$ compounds are readily producible in excellent yields from cyanuric chloride by displacing two chlorine atoms by appropriate OR groups by the methods shown by Diels et al., Ber., 36, 3191 (1903), and Dudley et al., Journal of the American Chemical Society, 73, 2986, 2989 (1951), by substituting the appropriate alcohol for the methanol used by the authors. These monochloro triazine derivatives are readily convertible in good yield to the hydroxy-hydrocarbon-amino derivatives, etc., by reacting them with a hydroxy-amine-hydrocarbon, etc., such as an alkanol amine, etc., according to the method of Kaiser et al., Journal of the American Chemical Society, 73, 2984 (1951), using the $$Cl-C_3N_3(OR)_2$$

compounds in place of the $Cl-C_3N_3(NR'_2)_2$ compounds used by the authors. The method shown by Banks et al., Journal of the American Chemical Society, 66, 1771 (1944), for the preparation of 2-chloro-4,6-di-(beta-hydroxyethylamino)-1,3,5-triazine and 2-chloro-4,6-di-(beta-hydroxy-n-propylamino)-1,3,5-triazine can be used to give the monohydroxy-alkylamino-$C_3N_3(OR)_2$ derivatives, as well as the corresponding aromatic compounds, by keeping the temperature at 5° C. and using $Cl-C_3N_3(OR)_2$ starting compounds in place of the $Cl-C_3N_3(NR'_2)_2$ starting compounds used by the authors.

These preparations are illustrated by the following examples in which parts and percentages, unless otherwise indicated, are parts by weight and percentages by weight.

INTERMEDIATE PREPARATION 1

To a rapidly stirred slurry of 35 parts of 2,4-dimethoxy-6-chloro-1,3,5-triazine (prepared according to the method shown by Dudley et al., J.A.C.S. 73, 2989 (1951) in 400 parts of water and a few drops of phenolphthalein indicator solution there is added 12.2 parts of ethanol amine, followed by the addition of 16.9 parts of sodium carbonate. The mixture is heated to reflux with the evolution of $CO_2$ beginning at 90° C., and held at reflux for two hours. The hot solution is filtered, then cooled to below room temperature by an ice water bath. The solid product is removed by filtration and dried. A yield of 22–23 parts is obtained. Upon concentration of the filtrate by evaporation, an additional 8–9 parts of product is obtained. The ultimate analysis is found to be 42.12 percent carbon, 5.89 percent hydrogen, and 29.08 percent nitrogen. These values are found to agree closely with the theoretical values for 2,4-dimethoxy-6-(beta-hydroxyethylamino)-1,3,5-triazine, which are 42.0, 6.0, and 28.0.

In another procedure, 185 parts of cyanuric chloride in 92 parts of ethanol are added to a solution of 80 parts of sodium hydroxide in 400 parts of water and stirred rapidly while maintaining the temperature at 40–50° C. for approximately an hour to give 2,4-diethoxy-6-chloro-1,3,5-triazine. Then a solution of 40 parts of sodium hydroxide in 100 parts of water is added and also 61 parts of ethanol amine are added gradually, after which the reaction mixture is refluxed at 80–100° C. for two hours. The hot solution is filtered, cooled, and processed according to the procedure of the preceding paragraph to obtain a good yield of 2,4-diethoxy-6-(beta-hydroxyethylamino)-1,3,5-triazine.

When the foregoing procedures are repeated using other monochloro-triazines having the various other OR groups described above, such as propoxy, butoxy, hexoxy, nonoxy, phenoxy, naphthoxy, cyclohexyloxy, etc., prepared by substituting the appropriate alcohol or phenol in place of methanol or ethanol in the above procedures, and using various other alkanol amines as well as aromatic hydroxy amino compounds as described herein, the corresponding triazine derivatives having the formula $$HO-A-NR''-C_3N_3(OR)_2$$

are prepared which can be used as intermediates in the preparation of the various compounds of this invention. Illustrative of these intermediates prepared by the foregoing procedures are the triazine hydroxy compounds listed above after Example I–a in the paragraph preceding triazine monomer III–A.

INTERMEDIATE PREPARATION 2

2,4-dimethoxy-6-chloro-1,3,5-triazine (176 parts) and 124 parts of ethylene glycol are added to a solution of 40 parts of sodium hydroxide in 400 parts of water. The mixture is heated to reflux for two hours, after which the hot solution is filtered, then cooled to below room temperature, and the solid precipitate recovered as above in Intermediate Preparation 1. A good yield of 2,4-dimethoxy-6-(beta-hydroxy-ethoxy)-1,3,5 - triazine is recovered and identified by ultimate analyses. Other dihydroxy compounds having A groups as defined herein, when substituted for the ethylene glycol, give corresponding intermediates that can be used in preparing the monomers of this invention and when triazine derivatives are used having other amino groups substituted in place of the methylamino groups of the monochlorodimethoxy-1,3,5-triazine compound used above, the corresponding derivatives are prepared which can also be used in preparing the monomers of this invention. Illustrative of the intermediates prepared by the foregoing procedure and having the formula HO—A—O—C$_3$N$_3$(OR)$_2$ are those listed after Example I-e in the paragraph preceding triazine monomer III-E.

INTERMEDIATE PREPARATION 3

(a) The 2,4-bis-(dimethylamino)-6-chloro-1,3,5-triazine (176 parts) and 102 parts of the monoacetamide of ethylene diamine are added to a solution of 80 parts of sodium hydroxide and 400 parts of water and the temperature maintained at 80° C. for two hours. Then the temperature is raised to reflux for three hours to effect saponification of the acetamide by the excess sodium hydroxide. The 2,4-dimethoxy-6-(beta-amino ethylamino)-1,3,5-triazine product is recovered in good yield when processed as in the preceding procedure.

(b) If desired the acrylic or various other unsaturated acid derivatives of this invention can be prepared directly from the acetamide compound prepared in the preceding paragraph by omitting the saponification step and performing an interchange of the acetic acid and acrylic acid groups according to standard procedures.

(c) 176 parts of 2,4-dimethoxy-6-chloro-1,3,5-triazine and 56 parts of amino-acetonitrile are added to a solution of 40 parts of sodium hydroxide in 400 parts of water and maintained at 80° C. for two hours. The 2,4-dimethoxy-6-(cyano-methylamino)1,3,5-triazine is recovered in good yield and is recrystallized from water-acetone solution. The product is dried and then reacted in ether solution with 132 parts of lithium aluminum hydride at 50° C. for three hours. The ether solution is then cooled and filtered. After removal of the solvent by evaporation, the 2,4-dimethoxy-6-(beta-amino-ethylamino)-1,3,5-triazine is recovered in good yield and is recrystallized from water solution as above.

By substituting various other starting compounds having different OR groups and different A groups as defined herein, the above procedures are also used satisfactorily for preparing the other intermediate amino compounds of the formula R''HN—A—NR''—C$_3$N$_3$(OR)$_2$ used in making various compounds of this invention. Typical of the intermediates prepared by the above procedure are those listed after Example I-f in the paragraph preceding triazine monomer III-F.

INTERMEDIATE PREPARATION 4

2,4-dimethoxy-6-chloro-1,3,5-triazine (176 parts) in 91 parts of beta-nitro-ethanol are added to a solution of 40 parts of sodium hydroxide in 400 parts of water and refluxed for two hours. The hot solution is then filtered and cooled to below room temperature and recovered as above in Intermediate Preparation 1. The recovered 2,4-dimethoxy-6-(beta-nitroethoxy)-1,3,5-triazine is then reacted in 200 parts of ether with 132 parts of lithium aluminum hydride at 50° C. for two hours. The solution is then cooled to room temperature, filtered, and the ether removed by evaporation. The resultant 2,4-dimethoxy-6-(beta-amino-ethoxy)-1,3,5-triazine is obtained in good yield and after recrystallization from water-acetone as above is identified by ultimate analyses.

By substituting other hydroxy nitro compounds, in which the A group is as defined above, for the beta-nitro ethanol and also substituting other OR groups for the methoxy groups of the starting monochloro-friazine starting compound, other intermediates of the formula R''HN—A—O—C$_3$N$_3$(OR)$_2$, of which typical examples are listed above after Example I-g (in the paragraph preceding triazine monomer III-G), can be prepared for use as starting materials in the preparation of monomers of this invention.

As pointed out above, it may be desirable in some cases to start with intermediate compounds which have the unsaturated acid group reacted first with the more reactive amino group of an amino hydroxy compound and thereafter react the free hydroxy group of such intermediate with a monochloro-triazine compound such as used above to attach the intermediate unsaturated amide by displacing the chlorine and thereby connecting the triazine nucleus to the oxygen of the aforesaid hydroxy group. Such intermediate amides are prepared very easily by using the corresponding unsaturated acid chloride, such as acrylyl chloride, or anhydride, such as maleic anhydride, itaconic anhydride, etc., with the appropriate amino hydroxy compound, such as ethanol amine, isopropanol amine, etc.

Preparation of various monochloro-triazine compounds Cl—C$_3$N$_3$(OR)$_2$ having the various OR groups as described above is effected by following the procedure shown in the cited Diels et al. and Dudley et al. references, using the appropriate hydroxy compounds to give the desired OR groups substituted on the 2,4 positions of the triazine ring.

This application is a continuation in part of applicant's copending applications, Serial Nos. 732,158, 732,166, 732,174, 732,182, 732,183, 732,184, 732,185, 732,186, 732,187, 732,188, 732,189, 732,190, 732,191, 732,192, 732,193, and 732,194, all filed on May 1, 1958.

While certain features of this invention have been described in detail with respect to various embodiments thereof, it will, of course, be apparent that other modifications may be made within the spirit and scope of this invention and it is not intended to limit the invention to the exact details shown above except insofar as they are defined in the following claims.

The invention claimed is:

1. As a new composition of matter, a compound having the formula

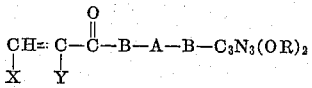

wherein B is selected from the class consisting of oxygen and —N(R'')—; A is a divalent hydrocarbon radical selected from the class consisting of aliphatic, cycloaliphatic and aromatic hydrocarbons, free of acetylenic unsaturation, having up to 20 carbon atoms therein and having at least two carbon atoms between said valencies and derivatives thereof having only one substituent group thereon, said substituent group being selected from the class consisting of chloro, fluoro, alkoxy, aryloxy, and acyloxy groups, said alkoxy, aryloxy and acyloxy groups having up to 10 carbon atoms therein, and with the proviso that where the B to which the

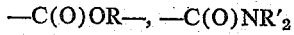

group is attached in the above formula is oxygen, that part of A to which B is attached is aliphatic; X is selected from the class consisting of hydrogen, cyano,

—C(O)OR—, —C(O)NR'$_2$ and —C(O)—B—A—B—C$_3$N$_3$(OR)$_2$ groups; Y is selected from the class consisting of hydrogen, alkyl groups of no more than 6 carbon atoms, and when X is hydrogen, Y is also selected from the class consisting of chloro, fluoro, bromo, iodo, —CH$_2$C(O)OR, —CH$_2$C(O)NR'$_2$, and —C(O)—B—A—B—C$_3$N$_3$(OR)$_2$ groups; C$_3$N$_3$ is the trivalent symmetrical triazine nucleus; R is selected from the class consisting of hydrogen and monovalent aliphatic, cycloaliphatic and aromatic hydrocarbon radicals, free of acetylenic unsaturation and having up to 20 carbon atoms therein, and derivatives thereof having only one substituent group thereon, said substituent group being selected from the class consisting of chloro, fluoro, alkoxy, aryloxy and acyloxy groups, said alkoxy, aryloxy and acyloxy groups having up to 10 carbon atoms therein; R' is selected from the class consisting of hydrogen, monovalent aliphatic, cycloaliphatic and aromatic hydrocarbon radicals, free of acetylenic unsaturation and having up to 20 carbon atoms therein, and derivatives thereof having only one substituent group thereon, said substituent group being selected from the class consisting of chloro, fluoro, alkoxy, aryloxy and acyloxy groups, said alkoxy, aryloxy and acyloxy groups having up to 10 carbon atoms therein, and portions of heterocyclic rings in which two R's together with the N to which they are attached represent a heterocyclic group selected from the class consisting of piperidinyl, piperazinyl, and morpholino groups; R" is selected from the class consisting of hydrogen, monovalent aliphatic, cycloaliphatic and aromatic hydrocarbon radicals, free of acetylenic unsaturation and having up to 20 carbon atoms therein, and derivatives thereof having only one substituent group thereon, said substituent group being selected from the class consisting of chloro, fluoro, alkoxy, aryloxy and acyloxy groups, said alkoxy, aryloxy and acyloxy groups having up to 10 carbon atoms therein.

2. 2,4 - dimethoxy-6-(beta-acryloxyethylamino)-1,3,5-triazine.

3. 2,4 - dimethoxy-6-(beta-acrylamidoethylamino)-1,3,5-triazine.

4. 2,4 - dimethoxy-6-(beta-acryloxyethoxy)-1,3,5-triazine.

5. 2,4 - dimethoxy-6-(beta-acrylamidoethoxy)-1,3,5-triazine.

6. 2,4 - dimethoxy-6-(acrylamidohexamethylene)-1,3,5-triazine.

7. 2,4 - dimethoxy-6-(beta-monoitaconoxyethylamino)-1,3,5-triazine.

8. 2,4 - dimethoxy-6-(beta-monoitaconamidoethylamino)-1,3,5-triazine.

9. 2,4 - dimethoxy-6-(beta-monoitaconoxyethoxy)-1,3,5-triazine.

10. 2,4 - dimethoxy-6-(beta-monoitaconamidoethoxy)-1,3,5-triazine.

11. 2,4 - dimethoxy-6-[beta-(betacyanoacrylamido)-ethylamino]-1,3,5-triazine.

12. 2,4 - dimethoxy-6-(beta-monomaleoxyethoxy)-1,3,5-triazine.

13. 2,4 - dimethoxy-6-(beta-monomaleamidoethoxy-1,3,5-triazine.

14. 2,4 - dimethoxy-6-(beta-monomaleamidoethylamino)-1,3,5-triazine.

15. A cold drawn fiber having molecular orientation, said fiber comprising a copolymer consisting essentially of about 60–98.9 percent by weight acrylonitrile, about 0.1 to 5 percent by weight of a compound of claim 1, and about 1 to 39.9 percent by weight of a compound selected from the class consisting of vinyl chloride, vinylidene chloride, styrene, alpha-methyl-styrene, methacrylonitrile, fumaronitrile, beta-cyano-acrylamide, and methyl-beta-cyano-acrylate.

16. A polymerization product having in the polymer molecule a plurality of repeating units having the formula

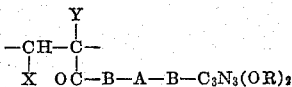

wherein B is selected from the class consisting of oxygen and —N(R")—; A is a divalent hydrocarbon radical selected from the class consisting of aliphatic, cycloaliphatic and aromatic hydrocarbons, free of acetylenic unsaturation, having up to 20 carbon atoms therein and having at least two carbon atoms between said valencies and derivatives thereof having only one substituent group thereon, said substituent group being selected from the class consisting of chloro, fluoro, alkoxy, aryloxy, and acyloxy groups, said alkoxy, aryloxy and acyloxy groups having up to 10 carbon atoms therein, and with the proviso that where the B to which the $$O\overset{|}{C}-$$

group is attached in the above formula is oxygen, that part of A to which B is attached is aliphatic; X is selected from the class consisting of hydrogen, cyano, —C(O)OR, —C(O)NR'$_2$, and —C(O)—B—A—B—C$_3$N$_3$(OR)$_2$ groups; Y is selected from the class consisting of hydrogen, alkyl groups of no more than 6 carbon atoms, and when X is hydrogen, Y is also selected from the class consisting of chloro, fluoro, bromo, iodo, —CH$_2$C(O)OR, —CH$_2$C(O)NR'$_2$, and —C(O)—B—A—B—C$_3$N$_3$(OR)$_2$ groups; C$_3$N$_3$ is the trivalent symmetrical triazine nucleus; R is selected from the class consisting of hydrogen and monovalent aliphatic, cycloaliphatic and aromatic hydrocarbon radicals, free of acetylenic unsaturation and having up to 20 carbon atoms therein, and derivatives thereof having only one substituent group thereon, said substituent group being selected from the class consisting of chloro, fluoro, alkoxy, aryloxy and acyloxy groups, said alkoxy, aryloxy and acyloxy groups having up to 10 carbon atoms therein; R' is selected from the class consisting of hydrogen and monovalent aliphatic, cycloaliphatic and aromatic hydrocarbon radicals, free of acetylenic unsaturation and having up to 20 carbon atoms therein, and derivatives thereof having only one substituent group thereon, said substituent group being selected from the class consisting of chloro, fluoro, alkoxy, aryloxy and acyloxy groups, said alkoxy, aryloxy and acyloxy groups having up to 10 carbon atoms therein, and portions of heterocyclic rings in which two R's together with the N to which they are attached represent a heterocyclic group selected from the class consisting of piperidinyl, piperazinyl, and morpholino groups; R" is selected from the class consisting of hydrogen, monovalent aliphatic, cycloaliphatic and aromatic hydrocarbon radicals, free of acetylenic unsaturation and having up to 20 carbon atoms therein, and derivatives thereof having only one substituent group thereon, said substituent group being selected from the class consisting of chloro, fluoro, alkoxy, aryloxy and acyloxy groups, said alkoxy, aryloxy and acyloxy groups having up to 10 carbon atoms therein, said polymerization product having a molecular weight of at least 10,000.

17. A polymerization product of claim 16, also having in the polymer molecule a plurality of repeating units having the formula $$-CH_2-\underset{CN}{\overset{|}{C}H}-$$

said $$-CH_2-\underset{CN}{\overset{|}{C}H}-$$

repeating units representing at least 50 percent by weight of said polymer molecule.

References Cited in the file of this patent
UNITED STATES PATENTS

| | | |
|---|---|---|
| 2,694,687 | de Benneville | Nov. 16, 1954 |
| 2,899,406 | de Benneville | Aug. 11, 1959 |
| 2,934,525 | Fekete | Apr. 26, 1960 |
| 2,993,877 | D'Alelio | July 25, 1961 |
| 3,047,532 | D'Alelio | July 31, 1962 |